(12) United States Patent
Okuno et al.

(10) Patent No.: US 12,191,529 B2
(45) Date of Patent: Jan. 7, 2025

(54) SECONDARY BATTERY

(71) Applicant: MURATA MANUFACTURING CO., LTD., Kyoto (JP)

(72) Inventors: Moriaki Okuno, Kyoto (JP); Yoshiichi Horikoshi, Kyoto (JP); Taichi Katsumoto, Kyoto (JP); Kazuki Honda, Kyoto (JP)

(73) Assignee: Murata Manufacturing Co., Ltd., Kyoto (JP)

(*) Notice: Subject to any disclaimer, the term of this patent is extended or adjusted under 35 U.S.C. 154(b) by 389 days.

(21) Appl. No.: 17/712,967

(22) Filed: Apr. 4, 2022

(65) Prior Publication Data

US 2022/0231384 A1 Jul. 21, 2022

Related U.S. Application Data

(63) Continuation of application No. PCT/JP2020/033537, filed on Sep. 4, 2020.

(30) Foreign Application Priority Data

Oct. 10, 2019 (JP) ................................ 2019-186909

(51) Int. Cl.
*H01M 50/533* (2021.01)
*H01M 10/04* (2006.01)
(Continued)

(52) U.S. Cl.
CPC ..... *H01M 50/533* (2021.01); *H01M 10/0427* (2013.01); *H01M 50/109* (2021.01);
(Continued)

(58) Field of Classification Search
CPC .. H01M 50/50; H01M 50/533; H01M 50/109; H01M 50/54; H01M 50/46
See application file for complete search history.

(56) References Cited

U.S. PATENT DOCUMENTS

2009/0305120 A1* 12/2009 Blomgren ............... H01M 4/70
429/211
2015/0221907 A1* 8/2015 Satou .................. H01M 50/264
429/157
2015/0236329 A1 8/2015 Okuda et al.

FOREIGN PATENT DOCUMENTS

CN 104584273 4/2015
JP 2010212206 A 9/2010
(Continued)

OTHER PUBLICATIONS

Chinese Office Action issued Sep. 13, 2023 in corresponding Chinese Application No. 202080064140.9.
(Continued)

*Primary Examiner* — Kenneth J Douyette
(74) *Attorney, Agent, or Firm* — K&L Gates LLP

(57) ABSTRACT

A secondary battery includes a power generation element including a plurality of electrodes. The electrodes are stacked on each other in a stacking direction with a separator interposed therebetween. Each of the electrodes includes a current collector led out in a first direction intersecting the stacking direction. Each of a plurality of current collectors led out in the first direction includes an end part, and the end part includes a first bent part that is bent in a second direction intersecting the first direction. Each of a plurality of first bent parts overlaps and is in contact with an adjacent first bent part in the second direction. At least one of the first bent parts terminates at a middle point on an end face along the second direction of the power generation element.

18 Claims, 14 Drawing Sheets

(51) Int. Cl.
     *H01M 50/109*    (2021.01)
     *H01M 50/46*     (2021.01)
     *H01M 50/528*    (2021.01)
     *H01M 50/531*    (2021.01)
     *H01M 50/54*     (2021.01)

(52) U.S. Cl.
     CPC ......... *H01M 50/46* (2021.01); *H01M 50/528* (2021.01); *H01M 50/531* (2021.01); *H01M 50/54* (2021.01)

(56) References Cited

FOREIGN PATENT DOCUMENTS

| | | |
|---|---|---|
| JP | 2011141997 A | 7/2011 |
| JP | 2013187182 A | 9/2013 |
| JP | 2015099723 | 5/2015 |
| JP | 2016025014 A | 2/2016 |
| WO | 2014034413 A1 | 3/2014 |
| WO | 2018190016 | 10/2018 |

OTHER PUBLICATIONS

International Search Report of corresponding PCT application PCT/JP2020/033537, dated Dec. 1, 2020.
European Search Report issued Jan. 29, 2024 in corresponding European Application No. 20874365.8.
Japanese Office Action issued Nov. 22, 2022 in corresponding Japanese Application No. 2021-550496.

* cited by examiner

SECONDARY BATTERY

CROSS REFERENCE TO RELATED APPLICATIONS

The present application is a continuation of PCT patent application no. PCT/JP2020/033537, filed on Sep. 4, 2020, which claims priority to Japanese patent application no. JP2019-186909 filed on Oct. 10, 2019, the entire contents of which are being incorporated herein by reference.

BACKGROUND

The present technology generally relates to a secondary battery.

Various electronic apparatuses such as mobile phones have been widely used. Such widespread use has promoted development of a secondary battery as a power source that is smaller in size and lighter in weight and allows for a higher energy density. A configuration of the secondary battery influences a battery characteristic. Accordingly, various considerations have been given to the configuration of the secondary battery.

Specifically, in order to obtain a favorable characteristic such as high productivity, a group of electrodes is contained inside a positive electrode case and a negative electrode case that are opposed to each other. All of positive electrode tabs are disposed above the group of electrodes and are electrically coupled to the positive electrode case, and all of negative electrode tabs are disposed below the group of electrodes and are electrically coupled to the negative electrode case. Further, in order to prevent variations in gaps in an electrode body (positive electrodes and negative electrodes), the electrode body is contained inside a positive electrode can and a negative electrode can that are opposed to each other. All of positive electrode leads are disposed on a side of the electrode body and are electrically coupled to each other, and all of negative electrode leads are disposed on another side of the electrode body opposite from the positive electrode leads and are electrically coupled to each other.

SUMMARY

The present technology generally relates to a secondary battery.

Various considerations have been made to solve problems of a secondary battery; however, the secondary battery has not yet achieved a sufficient energy density per unit volume, and there is still room for improvement in terms thereof.

The technology has been made in view of such an issue and it is an object of the technology to provide a secondary battery that makes it possible to increase an energy density per unit volume.

A secondary battery according to an embodiment of the technology includes a power generation element including a plurality of electrodes. The electrodes are stacked on each other in a stacking direction with a separator interposed therebetween. Each of the electrodes includes a current collector led out in a first direction intersecting the stacking direction. Each of a plurality of current collectors led out in the first direction includes an end part, and the end part includes a first bent part that is bent in a second direction intersecting the first direction. Each of a plurality of first bent parts overlaps and is in contact with an adjacent first bent part in the second direction. At least one of the first bent parts terminates at a middle point on an end face along the second direction of the power generation element.

According to the secondary battery of the embodiment of the technology, each of the plurality of electrodes stacked on each other with the separator interposed therebetween includes the current collector led out in the first direction. Each of the plurality of current collectors led out in the first direction includes the first bent part bent in the second direction. Each of the plurality of first bent parts overlaps and is in contact with an adjacent first bent part in the second direction. At least one of the first bent parts terminates at a middle point on the end face along the second direction of the power generation element. This makes it possible to increase the energy density per unit volume.

It should be understood that effects of the technology are not necessarily limited to those described above and may include any of a series of effects described below in relation to the technology.

DETAILED DESCRIPTION

As described herein, the present disclosure will be described based on examples with reference to the drawings, but the present disclosure is not to be considered limited to the examples, and various numerical values and materials in the examples are considered by way of example.

A description is given first of a secondary battery according to a first embodiment of the technology.

Described here is a secondary battery having a flat and columnar shape. Examples of such a secondary battery include a so-called coin-type secondary battery and a so-called button-type secondary battery. As will be described later, the secondary battery having a flat and columnar shape includes a pair of bottom parts and a sidewall part. The bottom parts are opposed to each other. The sidewall part lies between the bottom parts. This secondary battery has a height that is small relative to an outer diameter.

A charge and discharge principle of the secondary battery is not particularly limited. The secondary battery described below obtains a battery capacity by utilizing insertion and extraction of an electrode reactant. The secondary battery includes a positive electrode, a negative electrode, and an electrolytic solution. In the secondary battery, in order to prevent precipitation of the electrode reactant on a surface of the negative electrode in the middle of charging, a charge capacity of the negative electrode is greater than a discharge capacity of the positive electrode. In other words, an electrochemical capacity per unit area of the negative electrode is set to be greater than an electrochemical capacity per unit area of the positive electrode.

Although not limited to a particular kind, the electrode reactant is a light metal, such as an alkali metal or an alkaline earth metal. Examples of the alkali metal include lithium, sodium, and potassium. Examples of the alkaline earth metal include beryllium, magnesium, and calcium.

In the following, a description is given of an example case where the electrode reactant is lithium. A secondary battery that obtains a battery capacity by utilizing insertion and extraction of lithium is a so-called lithium-ion secondary battery. In the lithium-ion secondary battery, lithium is inserted and extracted in an ionic state.

Figure 1:
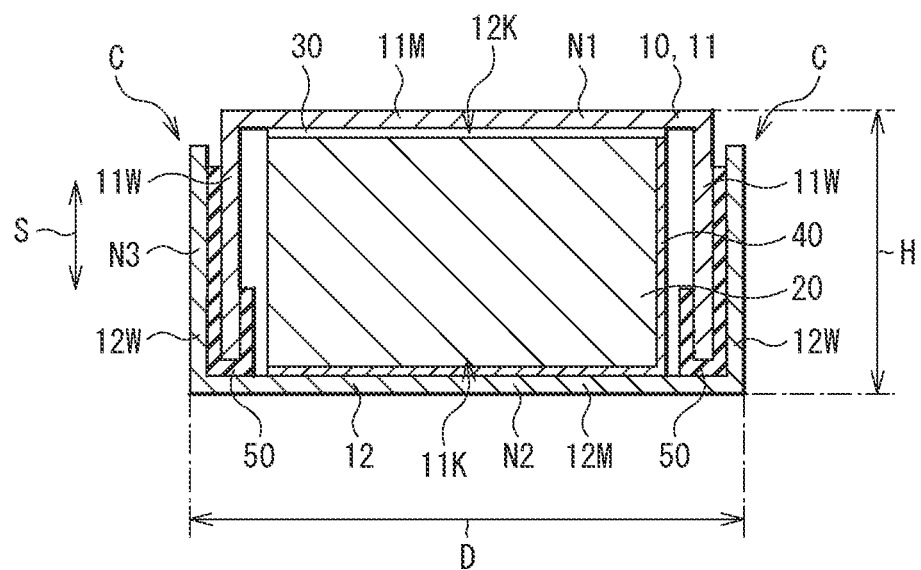
FIG. 1 is a sectional view of a configuration of a secondary battery according to an embodiment of the technology.
Figure 2:
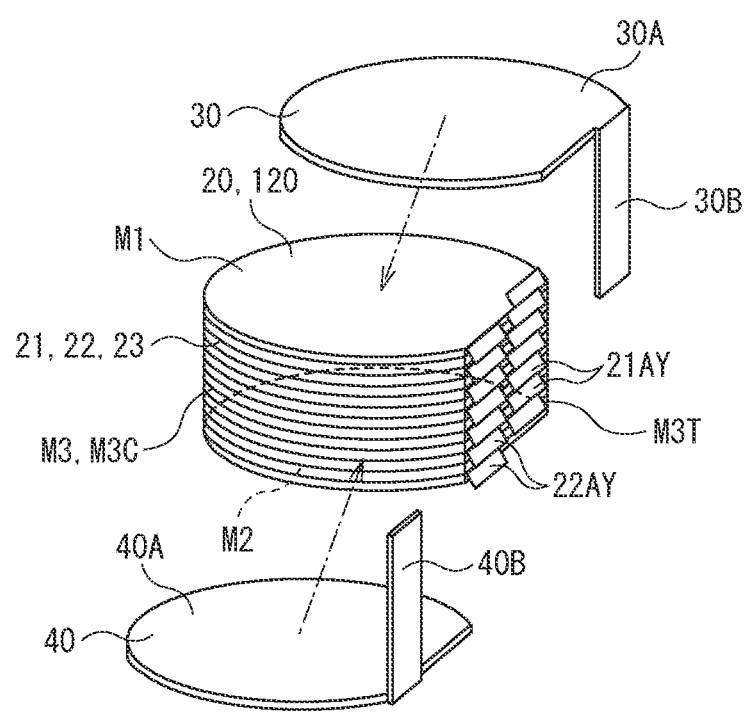
FIG. 2 is a perspective view of a configuration of a main part of the secondary battery illustrated in FIG. 1.

FIG. 1 is a sectional view of a configuration of the secondary battery. FIG. 2 is a perspective view of a configuration of a main part of the secondary battery illustrated in FIG. 1. It should be understood that FIG. 2 illustrates a battery device 20, a positive electrode tab 30, and a negative electrode tab 40 to be described later as the main part of the secondary battery, and also illustrates a state where the positive electrode tab 30 and the negative electrode tab 40 are each separated from the battery device 20.

In the following, for the sake of convenience, an up direction, a down direction, a right direction, and a left direction in FIGS. 1 and 2 are taken as corresponding to positions above, below, to the right, and to the left of the secondary battery, respectively. Further, a direction in which a positive electrode 21, a negative electrode 22, and a separator 23 to be described later are stacked, i.e., an up-and-down direction, will be referred to as a stacking direction S.

This secondary battery is a button-type secondary battery, and therefore, as illustrated in FIG. 1, has a flat and columnar three-dimensional shape with a height H thereof small relative to an outer diameter D thereof. Here, the secondary battery has a flat and cylindrical (circular columnar) three-dimensional shape. Dimensions of the secondary battery are not particularly limited; however, for example, the diameter (here, the diameter of the circular shape) D is from 3 mm to 30 mm both inclusive, and the height H is from 0.5 mm to 70 mm both inclusive. It should be understood that a ratio of the outer diameter D to the height H, i.e., D/H, is greater than 1 and smaller than or equal to 25.

Specifically, as illustrated in FIGS. 1 and 2, the secondary battery includes a battery can 10, the battery device 20, the positive electrode tab 30, the negative electrode tab 40, and a gasket 50.

As illustrated in FIG. 1, the battery can 10 is an outer package member having a flat and columnar shape and containing the battery device 20. This battery can 10 has a flat and cylindrical three-dimensional shape in accordance with the three-dimensional shape of the secondary battery described above. The battery can 10 thus includes a pair of bottom parts N1 and N2 and a sidewall part N3. The sidewall part N3 is coupled to the bottom part N1 at one end, and is coupled to the bottom part N2 at the other end. Because the battery can 10 is cylindrical as described above, the bottom parts N1 and N2 are each circular in plan shape, and a surface of the sidewall part N3 is a convex curved surface.

Here, the battery can 10 includes an outer package can 11 and an outer package cup 12.

The outer package can 11 has a hollow, flat and cylindrical three-dimensional shape with one end open and the other end closed, and is a first outer package part shaped like a so-called handleless mug. The outer package can 11 includes a bottom part 11M and a sidewall part 11W, and thus has an opening 11K. Further, the outer package can 11 contains the battery device 20 inside.

The outer package cup 12 has a hollow, flat and cylindrical three-dimensional shape with one end open and the other end closed, as with the outer package can 11, and is a second outer package part shaped like a so-called handleless mug. The outer package cup 12 includes a bottom part 12M and a sidewall part 12W, and thus has an opening 12K. Further, the outer package cup 12 is opposed to the outer package can 11 in the stacking direction S with the battery device 20 interposed therebetween, and thus seals the opening 11K of the outer package can 11.

In the battery can 10, in a state where the battery device 20 is contained inside the outer package can 11 and where the outer package can 11 and the outer package cup 12 are disposed to allow the openings 11K and 12K to be opposed to each other, the outer package can 11 and the outer package cup 12 are fitted to each other in such a manner that the bottom part 12M covers the opening 11K and that the sidewall part 12W lies over the sidewall part 11W from an outer side. The sidewall part 12W is thereby crimped to the sidewall part 11W with the gasket 50 interposed therebetween. A so-called crimp part C (crimped part) is thus provided. The battery can 10 including the outer package can 11 and the outer package cup 12 is sealed by means of the crimp part C, and the battery device 20 is thus enclosed in the battery can 10. In other words, the battery can 10 described here is a so-called crimp-type battery can. However, in FIG. 1, the illustration of the crimp part C (a crimp structure) is simplified.

The outer package can 11 is electrically conductive, and has one of a positive polarity and a negative polarity. The outer package cup 12 is electrically conductive, and has the other of the positive polarity and the negative polarity. Here, the outer package can 11 is coupled via the positive electrode tab 30 to the positive electrode 21 of the battery device 20 to be described later, and thus serves as a positive electrode terminal for external coupling of the secondary battery. Further, the outer package cup 12 is coupled via the negative electrode tab 40 to the negative electrode 22 of the battery device 20 to be described later, and thus serves as a negative electrode terminal for external coupling of the secondary battery. Thus, the outer package can 11 has the positive polarity, and the outer package cup 12 has the negative polarity which is opposite to the polarity of the outer package can 11.

In order to serve as the positive electrode terminal, the outer package can 11 includes one or more of electrically conductive materials including, without limitation, metals (including stainless steel) and alloys. Here, the outer package can 11 includes one or more of materials including, without limitation, aluminum, an aluminum alloy, and stainless steel.

In order to serve as the negative electrode terminal, the outer package cup 12 includes one or more of electrically conductive materials including, without limitation, metals (including stainless steel) and alloys. Here, the outer package cup 12 includes one or more of materials including, without limitation, iron, copper, nickel, stainless steel, an iron alloy, a copper alloy, and a nickel alloy. The kinds of the stainless steel employable include SUS304 and SUS316, but are not particularly limited thereto.

It should be understood that the outer package can 11 (the sidewall part 11W) and the outer package cup 12 (the sidewall part 12W) are electrically separated (insulated) from each other via the gasket 50.

The battery device 20 is a power generation element causing charging and discharging reactions to proceed, and includes, as illustrated in FIGS. 1 and 2, the positive electrode 21, the negative electrode 22, the separator 23, and an electrolytic solution which is a liquid electrolyte. It should be understood that FIG. 2 omits the illustration of the electrolytic solution.

It should be understood that FIG. 2 also illustrates a stacked body 120 to be used to fabricate the battery device 20 in a process of manufacturing the secondary battery to be described later. The stacked body 120 has a configuration similar to that of the battery device 20 except that the positive electrode 21, the negative electrode 22, and the separator 23 are each yet to be impregnated with the electrolytic solution.

The battery device 20 has a three-dimensional shape corresponding to the three-dimensional shape of the battery can 10. The "three-dimensional shape corresponding to the three-dimensional shape of the battery can 10" refers to a three-dimensional shape substantially similar to that of the battery can 10. A reason for allowing the battery device 20 to have such a three-dimensional shape is that this makes it harder for a so-called dead space (a gap between the battery can 10 and the battery device 20) to result upon placing the battery device 20 in the battery can 10 than in a case where the battery device 20 has a three-dimensional shape different from that of the battery can 10. This allows for efficient use of an internal space of the battery can 10, resulting in an increase in device space volume, and accordingly an increase in energy density per unit volume. The "device space volume" refers to a volume of an internal space of the battery can 10 available for containing the battery device 20 therein.

Here, the battery can 10 has a flat and cylindrical three-dimensional shape as described above, and the battery device 20 thus has a flat and generally cylindrical three-dimensional shape.

In the battery device 20, a plurality of positive electrodes 21 and a plurality of negative electrodes 22 are stacked on each other with the separators 23 interposed therebetween. More specifically, the positive electrodes 21 and the negative electrodes 22 are alternately stacked in the stacking direction S with the separators 23 interposed therebetween. Thus, the battery device 20 described here is a so-called stacked electrode body. It should be understood that each of an uppermost layer and a lowermost layer of the battery device 20 is one of the separators 23. The respective numbers of the positive electrodes 21, the negative electrodes 22, and the separators 23 to be stacked are not particularly limited, and may be freely chosen.

The positive electrode 21, the negative electrode 22, and the separator 23 each have a generally circular plan shape with a plane taper. Thus, the battery device 20 as a whole has a flat and generally cylindrical three-dimensional shape with a plane taper surface M3T. More specifically, the battery device 20 includes a pair of bottom parts M1 and M2 and a sidewall part M3. The bottom parts M1 and M2 are opposed to each other. The sidewall part M3 is coupled to each of the bottom parts M1 and M2. A surface of the sidewall part M3 includes a curved surface M3C, and the taper surface M3T coupled to the curved surface M3C.

It should be understood that a description will be given later regarding a detailed configuration of each of the positive electrode 21, the negative electrode 22, and the separator 23 (see FIGS. 3 and 4).

The positive electrode tab 30 is an electrode wiring line for electrically coupling a plurality of positive electrode current collectors 21A (see FIG. 3) described later to each other, and is coupled to the positive electrode current collectors 21A.

Here, as illustrated in FIG. 2, the positive electrode tab 30 is bent to be along the battery device 20, and more specifically, bent to be along the bottom part M1 and the sidewall part M3 (the taper surface M3T). The positive electrode tab 30 thus includes a tab part 30A, and a tab part 30B coupled to the tab part 30A. The tab part 30A extends along the bottom part M1 in a direction intersecting the stacking direction S, and has a plan shape similar to that of each of the positive electrode 21, the negative electrode 22, and the separator 23. The tab part 30B extends along the sidewall part M3 (the taper surface M3T) in a direction along the stacking direction S, i.e., in the down direction, and has a strip-like plan shape.

The positive electrode tab 30 includes a material similar to a material included in the positive electrode current collector 21A. It should be understood that the material included in the positive electrode tab 30 may be the same as or different from the material included in the positive electrode current collector 21A.

A description will be given later regarding a coupling form of the positive electrode tab 30 to the positive electrode current collectors 21A (see FIG. 3).

The negative electrode tab 40 is another electrode wiring line for electrically coupling a plurality of negative electrode current collectors 22A (see FIG. 4) described later to each other, and is coupled to the negative electrode current collectors 22A.

Here, the negative electrode tab 40 has a configuration similar to that of the positive electrode tab 30 described above. In other words, as illustrated in FIG. 2, the negative electrode tab 40 is bent to be along the battery device 20, and more specifically, bent to be along the bottom part M2 and the sidewall part M3 (the taper surface M3T). The negative electrode tab 40 thus includes a tab part 40A, and a tab part 40B coupled to the tab part 40A. The tab part 40A extends along the bottom part M2 in the direction intersecting the stacking direction S, and has a plan shape similar to that of each of the positive electrode 21, the negative electrode 22, and the separator 23. The tab part 40B extends along the sidewall part M3 (the taper surface M3T) in a direction along the stacking direction S, i.e., in the up direction, and has a strip-like plan shape.

The negative electrode tab 40 includes a material similar to a material included in the negative electrode current collector 22A. It should be understood that the material included in the negative electrode tab 40 may be the same as or different from the material included in the negative electrode current collector 22A.

A description will be given later regarding a coupling form of the negative electrode tab 40 to the negative electrode current collectors 22A (see FIG. 4).

The gasket 50 is an insulating member interposed between the outer package can 11 (the sidewall part 11W) and the outer package cup 12 (the sidewall part 12W), as illustrated in FIG. 1. The gasket 50 seals a space between the outer package can 11 and the outer package cup 12, and insulates the outer package can 11 and the outer package cup 12 from each other, as described above.

The gasket 50 includes one or more of insulating materials including, without limitation, polypropylene and polyethylene. A mounting range of the gasket 50 is not particularly limited. Here, the mounting range of the gasket 50 is not limited to the space between the sidewall parts 11W and 12W but is extended to the inside of the battery can 10, that is, onto an inner surface of the sidewall part 11W.

It should be understood that the secondary battery may further include one or more of other unillustrated components.

Specifically, the secondary battery includes a safety valve mechanism. The safety valve mechanism cuts off the electrical coupling between the battery can 10 and the battery device 20 if an internal pressure of the battery can 10 reaches a certain level or higher due to, e.g., an internal short circuit or heating from outside. A mounting position of the safety valve mechanism is not particularly limited. The safety valve mechanism may thus be provided at the outer package can 11 or at the outer package cup 12.

Further, the secondary battery includes an insulator between the battery can 10 and the battery device 20. The insulator includes one or more of materials including, without limitation, an insulating film and an insulating sheet. The insulator prevents a short circuit between the outer package can 11 and the negative electrodes 22, and prevents a short circuit between the outer package cup 12 and the positive electrodes 21. A mounting range of the insulator is not particularly limited, and may thus be freely chosen.

It should be understood that the battery can 10 is provided with, for example, a liquid injection hole and a cleavage valve. The liquid injection hole is used for injecting the electrolytic solution into the battery can 10, and is sealed after use. In a case where the internal pressure of the battery can 10 reaches a certain level or higher due to, e.g., an internal short circuit or heating from outside as described above, the cleavage valve cleaves to release the internal pressure. There is no limitation on the respective positions at which the liquid injection hole and the cleavage valve are to be provided. Each of the liquid injection hole and the cleavage valve may thus be provided at the outer package can 11 or at the outer package cup 12.

Figure 3:
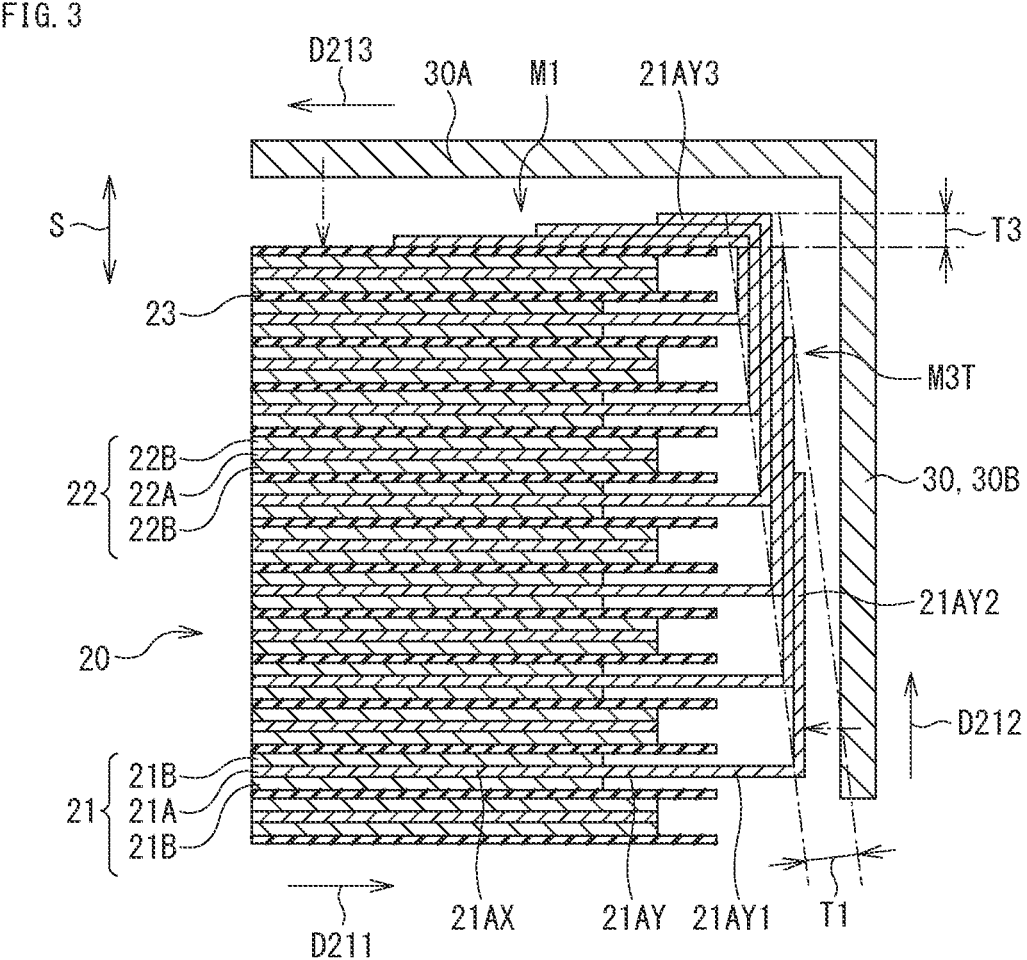
FIG. 3 is an enlarged sectional view of the configuration of the main part of the secondary battery illustrated in FIG. 1.
Figure 4:
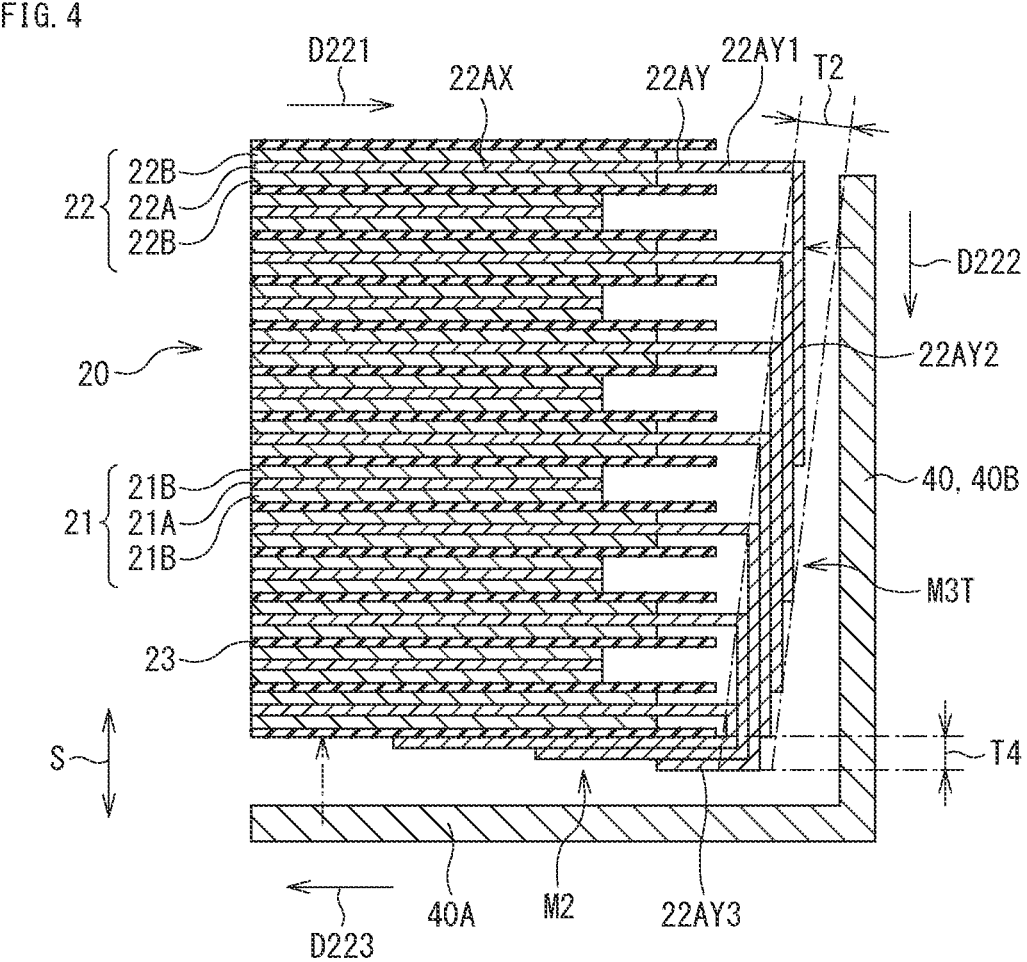
FIG. 4 is another enlarged sectional view of the configuration of the main part of the secondary battery illustrated in FIG. 1.

FIGS. 3 and 4 each illustrate an enlarged sectional configuration of the main part of the secondary battery (the battery device 20, the positive electrode tab 30, and the negative electrode tab 40) illustrated in FIG. 1.

It should be understood that FIG. 3 illustrates a section along the positive electrode tab 30, and FIG. 4 illustrates a section along the negative electrode tab 40. Further, FIG. 3 illustrates a state where the positive electrode tab 30 is separated from the battery device 20 for easy viewing of the coupling form of the positive electrode tab 30, and FIG. 4 illustrates a state where the negative electrode tab 40 is separated from the battery device 20 for easy viewing of the coupling form of the negative electrode tab 40.

In the following, the detailed configuration of each of the positive electrode 21, the negative electrode 22, and the separator 23 will be described first, and thereafter the coupling form of each of the positive electrode tab 30 and the negative electrode tab 40 will be described. In this case, FIGS. 1 and 2 described already will be referred to when necessary.

In the battery device 20 which is a stacked electrode body, as described above, the positive electrodes 21 and the negative electrodes 22 are alternately stacked in the stacking direction S with the separators 23 interposed therebetween. The battery device 20 thus includes the separators 23 together with the positive electrodes 21 and the negative electrodes 22.

Here, as one example, six positive electrodes 21 and seven negative electrodes 22 are alternately stacked with the separators 23 interposed therebetween in such a manner that each of a lowermost layer and an uppermost layer among the positive electrodes 21 and the negative electrodes 22 is one of the negative electrodes 22. It should be understood that the respective numbers of the positive electrodes 21 and the negative electrodes 22 to be stacked are not particularly limited, and may thus be freely chosen.

The positive electrodes 21 are electrodes included in the battery device 20. Each of the positive electrodes 21 includes the positive electrode current collector 21A and a positive electrode active material layer 21B, as illustrated in FIG. 3. Here, the positive electrode active material layer 21B is provided on each of both sides of the positive electrode current collector 21A. It should be understood that the positive electrode active material layer 21B may be provided only on one side of the positive electrode current collector 21A.

The positive electrode current collector 21A includes a material similar to the material included in the outer package can 11. It should be understood that the material included in the positive electrode current collector 21A may be the same as or different from the material included in the outer package can 11. As will be described later, the positive electrode current collector 21A is led more outward than the positive electrode active material layer 21B.

The positive electrode active material layer 21B includes a positive electrode active material into which lithium is insertable and from which lithium is extractable. The positive electrode active material includes one or more of lithium-containing compounds including, without limitation, a lithium-containing transition metal compound. Examples of the lithium-containing transition metal compound include an oxide, a phosphoric acid compound, a silicic acid compound, and a boric acid compound each including lithium and one or more transition metal elements as constituent elements. It should be understood that the positive electrode active material layer 21B may further include, without limitation, a positive electrode binder and a positive electrode conductor.

The negative electrodes 22 are the other electrodes included in the battery device 20. Each of the negative electrodes 22 includes the negative electrode current collector 22A and a negative electrode active material layer 22B, as illustrated in FIG. 4. Here, the negative electrode active material layer 22B is provided on each of both sides of the negative electrode current collector 22A. It should be understood that the negative electrode active material layer 22B may be provided only on one side of the negative electrode current collector 22A.

The negative electrode current collector 22A includes a material similar to the material included in the outer package cup 12. It should be understood that the material included in the negative electrode current collector 22A may be the same as or different from the material included in the outer package cup 12. As will be described later, the negative electrode current collector 22A is led more outward than the negative electrode active material layer 22B. It should be understood that the negative electrode current collector 22A is led out to a position not overlapping a position to which the positive electrode current collector 21A is led out. In other words, the negative electrode current collector 22A is so led out as not to come into contact with the positive electrode current collector 21A. This is for the purpose of preventing a short circuit between the positive electrode current collector 21A and the negative electrode current collector 22A.

The negative electrode active material layer 22B includes a negative electrode active material into which lithium is insertable and from which lithium is extractable. The negative electrode active material includes one or more of materials including, without limitation, a carbon material and a metal-based material. Examples of the carbon material include graphite. The metal-based material is a material that includes, as a constituent element or constituent elements, one or more elements among metal elements and metalloid elements that are each able to form an alloy with lithium. Specifically, the metal-based material includes one or more of elements including, without limitation, silicon and tin, as a constituent element or constituent elements. The metal-based material may be a simple substance, an alloy, a compound, or a mixture of two or more thereof. It should be understood that the negative electrode active material layer 22B may further include, without limitation, a negative electrode binder and a negative electrode conductor.

The separator 23 is an insulating porous film interposed between the positive electrode 21 and the negative electrode 22. The separator 23 allows lithium to pass therethrough in an ionic state while preventing a short circuit between the positive electrode 21 and the negative electrode 22. This separator 23 includes one or more of polymer compounds, including polyethylene.

It should be understood that the positive electrode 21 preferably has an outer diameter smaller than an outer diameter of the separator 23. A reason for this is that this prevents a short circuit between the positive electrode 21 and the outer package cup 12. The negative electrode 22 preferably has a height smaller than the outer diameter of the separator 23 and greater than a height of the positive electrode 21. A reason for this is that this prevents a short circuit between the negative electrode 22 and the outer package can 11 and also prevents a short circuit between the positive electrode 21 and the negative electrode 22 caused by precipitation of lithium upon charging and discharging.

The positive electrode 21, the negative electrode 22, and the separator 23 are each impregnated with the electrolytic solution. The electrolytic solution includes a solvent and an electrolyte salt. The solvent includes one or more of non-aqueous solvents (organic solvents) including, without limitation, a carbonic-acid-ester-based compound, a carboxylic-acid-ester-based compound, and a lactone-based compound. The electrolyte salt includes one or more of light metal salts, including a lithium salt.

Here, a detailed configuration of the positive electrode current collector 21A will be described first as a precondition for describing a configuration of the positive electrode tab 30, and thereafter the coupling form of the positive electrode tab 30 will be described. This order of descriptions applies also to the descriptions of a detailed configuration of the negative electrode current collector 22A and the coupling form of the negative electrode tab 40.

The positive electrodes 21 each include the positive electrode current collector 21A as described above. The battery device 20 therefore includes a plurality of positive electrode current collectors 21A. Here, respective lengths of the positive electrode current collectors 21A are equal.

In each of the positive electrodes 21, the positive electrode current collector 21A is led more outward than the positive electrode active material layer 21B, as described above. More specifically, the positive electrode current collector 21A is led out in a leading-out direction D211 (a first direction, i.e., the right direction) intersecting the stacking direction S. Thus, as illustrated in FIG. 3, the positive electrode current collector 21A includes a non-led-out part 21AX, and a led-out part 21AY coupled to the non-led-out part 21AX. The non-led-out part 21AX is a part that is covered with the positive electrode active material layer 21B and is thus not led more outward than the positive electrode active material layer 21B. The led-out part 21AY is a part that is not covered with the positive electrode active material layer 21B and is thus led more outward than the positive electrode active material layer 21B.

The positive electrode current collector 21A led out in the leading-out direction D211 includes an end part that is bent in a first bending direction D212 (a second direction, i.e., the up direction) intersecting the leading-out direction D211. In other words, the led-out part 21AY led out in the leading-out direction D211 is bent in the first bending direction D212 at some middle point. Here, the led-out part 21AY which is a part of the positive electrode current collector 21A having the positive polarity is bent in a direction away from the outer package cup 12 having the negative polarity opposite to the positive polarity, that is, the outer package cup 12 serving as the negative electrode terminal. The first bending direction D212 is therefore a direction from the outer package cup 12 toward the outer package can 11, that is, the up direction. This is for the purpose of preventing a short circuit between the led-out part 21AY and the outer package cup 12.

As the battery device 20 includes the plurality of positive electrodes 21, each of the positive electrodes 21 includes the non-led-out part 21AX and the led-out part 21AY. The battery device 20 thus includes a plurality of led-out parts 21AY.

Each of the led-out parts 21AY bent in the first bending direction D212 overlaps and is in contact with another one of the led-out parts 21AY adjacent thereto (in front thereof) in the first bending direction D212, and is therefore coupled to the adjacent one of the led-out parts 21AY. Here, each of the led-out parts 21AY is joined to the adjacent one of the led-out parts 21AY by means of a method such as a welding method.

Here, of the plurality of led-out parts 21AY, one or more led-out parts 21AY that are located on a rear side in the first bending direction D212 are bent once and thus terminate at some middle point along the first bending direction D212. In other words, the one or more led-out parts 21AY each terminate at some middle point on an end face along the first bending direction D212 of the battery device 20, i.e., the taper surface M3T of the sidewall part M3. As a result, the one or more led-out parts 21AY are bent only in the first bending direction D212, and are thus bent to be along the battery device 20 (the taper surface M3T).

The one or more led-out parts 21AY each include a non-bent part 21AY1, and a first bent part 21AY2 coupled to the non-bent part 21AY1. The non-bent part 21AY1 is disposed on a side closer to the positive electrode active material layer 21B than the first bent part 21AY2, and extends in the leading-out direction D211. The first bent part 21AY2 is disposed on a side farther from the positive electrode active material layer 21B than the non-bent part 21AY1, and extends in the first bending direction D212.

The number of the one or more led-out parts 21AY that are bent once is not particularly limited, and may thus be freely chosen. In other words, the number of the one or more led-out parts 21AY may be one, or may be two or more but is less than the total number of the plurality of led-out parts 21AY.

Further, in each of the one or more led-out parts 21AY that are bent once, the position of an end of the first bent part 21AY2 may be freely chosen. In other words, respective ends of a plurality of first bent parts 21AY2 may be at the same position or at different positions from each other. Here, the positions of the respective ends of the first bent parts 21AY2 are gradually recessed toward a direction opposite to the first bending direction D212.

Here, in a case where the six positive electrodes 21 and the seven negative electrodes 22 are alternately stacked with the separators 23 interposed therebetween, three led-out parts 21AY located on the rear side in the first bending direction D212 are bent once. Further, the positions of the ends of the respective first bent parts 21AY2 of the three led-out parts 21AY are gradually recessed toward the direction opposite to the first bending direction D212.

Besides, of the plurality of led-out parts 21AY, the remaining one or more led-out parts 21AY that are located on a front side in the first bending direction D212 are bent twice, and are thus bent in the first bending direction D212 and thereafter bent further in a second bending direction D213 (a third direction, i.e., the left direction) opposite to the leading-out direction D211. In other words, the remaining one or more led-out parts 21AY are bent in the first bending direction D212 and thereafter bent in the second bending direction D213, and are therefore bent to be along the sidewall part M3 (the taper surface M3T) and thereafter bent to be along the bottom part M1.

Accordingly, the remaining one or more led-out parts 21AY each include, together with the non-bent part 21AY1 and the first bent part 21AY2, a second bent part 21AY3 coupled to the first bent part 21AY2, unlike the foregoing one or more led-out parts 21AY. The second bent part 21AY3 is disposed on a side farther from the non-bent part 21AY1 than the first bent part 21AY2, and extends in the second bending direction D213.

The number of the remaining one or more led-out parts 21AY that are bent twice is not particularly limited, and may thus be freely chosen. In other words, the number of the remaining one or more led-out parts 21AY may be one, or may be two or more but is less than the total number of the plurality of led-out parts 21AY.

Further, the position of an end of the led-out part 21AY bent twice may be freely chosen. In other words, respective ends of a plurality of second bent parts 21AY3 may be at the same position, or at different positions from each other. Here, the positions of the respective ends of the second bent parts 21AY3 are gradually recessed toward a direction opposite to the second bending direction D213.

Here, in the case where the six positive electrodes 21 and the seven negative electrodes 22 are alternately stacked with the separators 23 interposed therebetween, three led-out parts 21AY located on the front side in the first bending direction D212 are bent twice. Further, the positions of the ends of the respective second bent parts 21AY3 of the three led-out parts 21AY are gradually recessed toward the direction opposite to the second bending direction D213.

As described above, the positive electrode tab 30 includes the tab part 30A along the bottom part M1 and the tab part 30B along the sidewall part M3 (the taper surface M3T). Thus, in the positive electrode tab 30, the tab part 30A is coupled to the remaining one or more led-out parts 21AY (the second bent part(s) 21AY3 of the led-out part(s) 21AY that are bent twice) of the plurality of led-out parts 21AY, and the tab part 30B is coupled to the one or more led-out parts 21AY (the first bent part(s) 21AY2 of the led-out part(s) 21AY that are bent once) of the plurality of led-out parts 21AY. In this case, the tab part 30A is joined to the remaining one or more led-out parts 21AY by means of a method such as a welding method, and the tab part 30B is joined to the one or more led-out parts 21AY by means of a method such as a welding method.

The positive electrode tab 30 is coupled to the outer package can 11 (the bottom part 11M) at the tab part 30A. The outer package can 11 is thereby coupled to the positive electrodes 21 (the positive electrode current collectors 21A) via the positive electrode tab 30 (the tab part 30A and the tab part 30B), and thus serves as the positive electrode terminal.

The negative electrode current collector 22A has a configuration similar to that of the positive electrode current collector 21A described above, and the negative electrode tab 40 has a configuration similar to that of the positive electrode tab 30 described above. It should be understood that the coupling method (the joining method) has already been described, and the description thereof will thus be omitted from the following.

The negative electrodes 22 each include the negative electrode current collector 22A as described above. The battery device 20 therefore includes a plurality of negative electrode current collectors 22A. Here, respective lengths of the negative electrode current collectors 22A are equal.

In each of the negative electrodes 22, the negative electrode current collector 22A is led more outward than the negative electrode active material layer 22B as described above. More specifically, the negative electrode current collector 22A is led out in a leading-out direction D221 (a first direction, i.e., the right direction) intersecting the stacking direction S. Thus, as illustrated in FIG. 4, the negative electrode current collector 22A includes a non-led-out part 22AX, and a led-out part 22AY coupled to the non-led-out part 22AX. The non-led-out part 22AX is a part that is covered with the negative electrode active material layer 22B and is thus not led more outward than the negative electrode active material layer 22B. The led-out part 22AY is a part that is not covered with the negative electrode active material layer 22B and is thus led more outward than the negative electrode active material layer 22B.

The negative electrode current collector 22A led out in the leading-out direction D221 includes an end part that is bent in a first bending direction D222 (a second direction, i.e., the down direction) intersecting the leading-out direction D221. In other words, the led-out part 22AY led out in the leading-out direction D221 is bent in the first bending direction D222 at some middle point. Here, the led-out part 22AY which is a part of the negative electrode current collector 22A having the negative polarity is bent in a direction away from the outer package can 11 having the positive polarity opposite to the negative polarity, that is, the outer package can 11 serving as the positive electrode terminal. The first bending direction D222 is therefore a direction from the outer package can 11 toward the outer package cup 12, that is, the down direction. This is for the purpose of preventing a short circuit between the led-out part 22AY and the outer package can 11.

As the battery device 20 includes the plurality of negative electrodes 22, each of the negative electrodes 22 includes the non-led-out part 22AX and the led-out part 22AY. The battery device 20 thus includes a plurality of led-out parts 22AY.

Each of the led-out parts 22AY bent in the first bending direction D222 overlaps and is in contact with another one of the led-out parts 22AY adjacent thereto (in front thereof) in the first bending direction D222, and is therefore coupled to the adjacent one of the led-out parts 22AY.

Here, of the plurality of led-out parts 22AY, one or more led-out parts 22AY that are located on the rear side in the first bending direction D222 are bent once and therefore terminate at some middle point along the first bending direction D222. In other words, the one or more led-out parts 22AY each terminate at some middle point on the end face along the first bending direction D222 of the battery device 20, i.e., the taper surface M3T of the sidewall part M3. As a result, the one or more led-out parts 22AY are bent only in the first bending direction D222, and are thus bent to be along the battery device 20 (the taper surface M3T).

The one or more led-out parts 22AY each include a non-bent part 22AY1, and a first bent part 22AY2 coupled to the non-bent part 22AY1. The non-bent part 22AY1 is disposed on a side closer to the negative electrode active material layer 22B than the first bent part 22AY2, and extends in the leading-out direction D221. The first bent part 22AY2 is disposed on a side farther from the negative electrode active material layer 22B than the non-bent part 22AY1, and extends in the first bending direction D222.

The number of the one or more led-out parts 22AY that are bent once is not particularly limited, and may thus be freely chosen. In other words, the number of the one or more led-out parts 22AY may be one, or may be two or more but is less than the total number of the plurality of led-out parts 22AY.

Further, in each of the one or more led-out parts 22AY that are bent once, the position of an end of the first bent part 22AY2 may be freely chosen. In other words, respective ends of a plurality of first bent parts 22AY2 may be at the same position or at different positions from each other. Here, the positions of the respective ends of the first bent parts 22AY2 are gradually recessed toward a direction opposite to the first bending direction D222.

Here, in the case where the six positive electrodes 21 and the seven negative electrodes 22 are alternately stacked with the separators 23 interposed therebetween, four led-out parts 22AY located on the rear side in the first bending direction D222 are bent once. Further, the positions of the ends of the respective first bent parts 22AY2 of the four led-out parts 22AY are gradually recessed toward the direction opposite to the first bending direction D222.

Besides, of the plurality of led-out parts 22AY, the remaining one or more led-out parts 22AY that are located on the front side in the first bending direction D222 are bent twice, and are thus bent in the first bending direction D222 and thereafter bent further in a second bending direction D223 (a third direction, i.e., the left direction) opposite to the leading-out direction D221. In other words, the remaining one or more led-out parts 22AY are bent in the first bending direction D222 and thereafter bent in the second bending direction D223, and are therefore bent to be along the sidewall part M3 (the taper surface M3T) and thereafter bent to be along the bottom part M2.

Accordingly, the remaining one or more led-out parts 22AY each include, together with the non-bent part 22AY1 and the first bent part 22AY2, a second bent part 22AY3 coupled to the first bent part 22AY2, unlike the foregoing one or more led-out parts 22AY. The second bent part 22AY3 is disposed on a side farther from the non-bent part 22AY1 than the first bent part 22AY2, and extends in the second bending direction D223.

The number of the remaining one or more led-out parts 22AY that are bent twice is not particularly limited, and may thus be freely chosen. In other words, the number of the remaining one or more led-out parts 22AY may be one, or may be two or more but is less than the total number of the plurality of led-out parts 22AY.

Further, the position of an end of the led-out part 22AY bent twice may be freely chosen. In other words, respective ends of a plurality of second bent parts 22AY3 may be at the same position, or at different positions from each other. Here, the positions of the respective ends of the second bent parts 22AY3 are gradually recessed toward a direction opposite to the second bending direction D223.

Here, in the case where the six positive electrodes 21 and the seven negative electrodes 22 are alternately stacked with the separators 23 interposed therebetween, three led-out parts 22AY located on the front side in the first bending direction D222 are bent twice. Further, the positions of the ends of the respective second bent parts 22AY3 of the three led-out parts 22AY are gradually recessed toward the direction opposite to the second bending direction D223.

As described above, the negative electrode tab 40 includes the tab part 40A along the bottom part M2 and the tab part 40B along the sidewall part M3 (the taper surface M3T). Thus, in the negative electrode tab 40, the tab part 40A is coupled to the remaining one or more led-out parts 22AY (the second bent part(s) 22AY3 of the led-out part(s) 22AY that are bent twice) of the plurality of led-out parts 22AY, and the tab part 40B is coupled to the one or more led-out parts 22AY (the first bent part(s) 22AY2 of the led-out part(s) 22AY that are bent once) of the plurality of led-out parts 22AY.

The negative electrode tab 40 is coupled to the outer package cup 12 (the bottom part 12M) at the tab part 40A. The outer package cup 12 is thereby coupled to the negative electrodes 22 (the negative electrode current collectors 22A) via the negative electrode tab 40 (the tab part 40A and the tab part 40B), and thus serves as the negative electrode terminal.

Here, as illustrated in FIG. 2, the led-out parts 21AY and 22AY are disposed to be adjacent to each other at the sidewall part M3 (the taper surface M3T). Thus, the leading-out direction D211 for the led-out part 21AY and the leading-out direction D221 for the led-out part 22AY are a common direction. More specifically, the leading-out direction D211 for the led-out part 21AY is the right direction, and the leading-out direction D221 for the led-out part 22AY is also the right direction.

Upon charging the secondary battery, in the battery device 20, lithium is extracted from the positive electrode 21, and the extracted lithium is inserted into the negative electrode 22 via the electrolytic solution. Upon discharging the secondary battery, in the battery device 20, lithium is extracted from the negative electrode 22, and the extracted lithium is inserted into the positive electrode 21 via the electrolytic solution. In these cases, the lithium is inserted and extracted in an ionic state.

Upon charging and discharging, the positive electrode current collectors 21A are electrically coupled to each other by means of the positive electrode tab 30, and the negative electrode current collectors 22A are electrically coupled to each other by means of the negative electrode tab 40.

Figure 5:
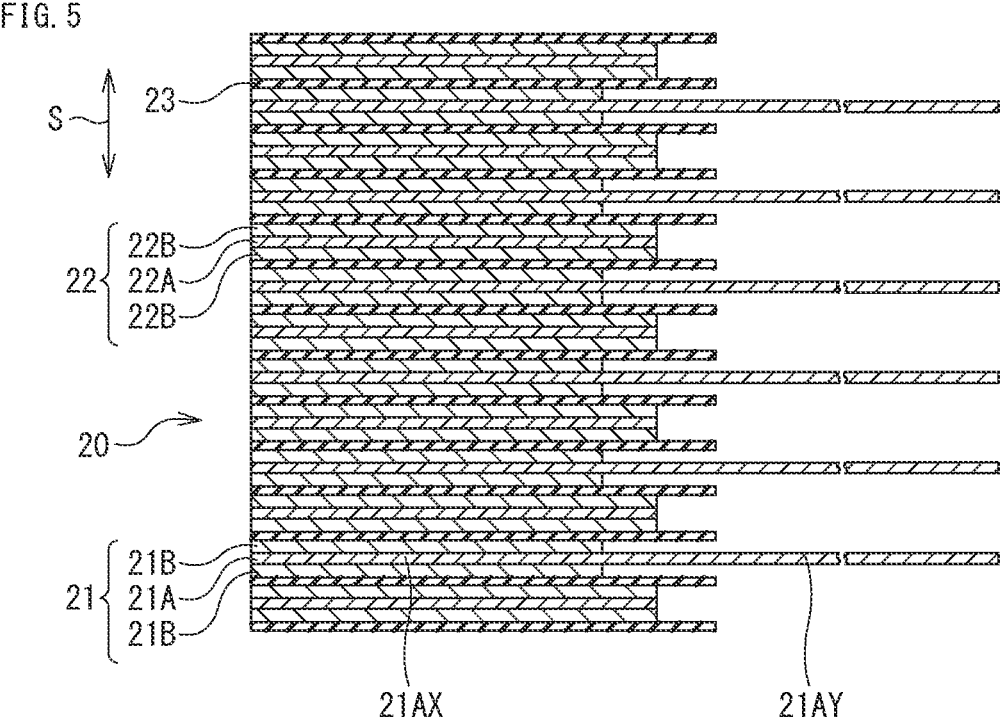
FIG. 5 is a sectional diagram for describing a process of manufacturing the secondary battery according to an embodiment of the technology.
Figure 6:
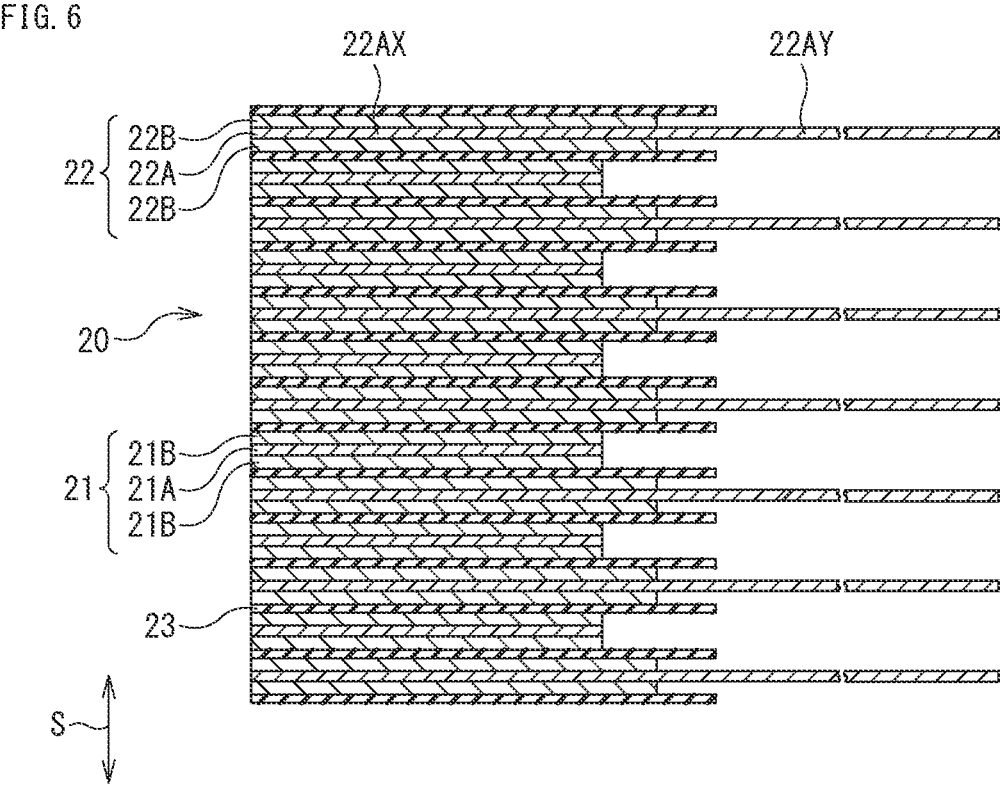
FIG. 6 is another sectional diagram for describing the process of manufacturing the secondary battery according to an embodiment of the technology.

For describing a process of manufacturing the secondary battery, FIGS. 5 and 6 each illustrate a sectional configuration of the secondary battery in the course of manufacture. It should be understood that FIG. 5 corresponds to FIG. 3, and FIG. 6 corresponds to FIG. 4.

In a case of manufacturing the secondary battery, the secondary battery is assembled by a procedure described below. In this case, the stacked body 120 described above is used to fabricate the battery device 20. In the following, FIGS. 1 to 4 described already will be referred to when necessary.

First, prepared is a slurry including, without limitation, the positive electrode active material in a solvent such as an organic solvent, following which the slurry is applied on both sides of the positive electrode current collector 21A (the non-led-out part 21AX) to thereby form the positive electrode active material layers 21B. The positive electrode 21 which includes the positive electrode current collector 21A and the positive electrode active material layers 21B and in which the led-out part 21AY is led more outward than the positive electrode active material layers 21B is thereby fabricated.

Thereafter, prepared is a slurry including, without limitation, the negative electrode active material in a solvent such as an organic solvent, following which the slurry is applied on both sides of the negative electrode current collector 22A (the non-led-out part 22AX) to thereby form the negative electrode active material layers 22B. The negative electrode 22 which includes the negative electrode current collector 22A and the negative electrode active material layers 22B and in which the led-out part 22AY is led more outward than the negative electrode active material layers 22B is thereby fabricated.

Thereafter, the electrolyte salt is added to a solvent. The electrolytic solution including the solvent and the electrolyte salt is thereby prepared.

Thereafter, a plurality of positive electrodes 21 and a plurality of negative electrodes 22 are alternately stacked with the separators 23 interposed therebetween to thereby fabricate the stacked body 120.

Thereafter, each of a plurality of led-out parts 21AY is bent. In this case, one or more, but not all, of the led-out parts 21AY are each bent once to include the non-bent part 21AY1 and the first bent part 21AY2, and the remaining one or more led-out parts 21AY are each bent twice to include the non-bent part 21AY1, the first bent part 21AY2, and the second bent part 21AY3. The plurality of led-out parts 21AY is bent in such a manner that each of the led-out parts 21AY overlaps and comes into contact with another one of the led-out parts 21AY adjacent thereto in the first bending direction D212.

Further, each of a plurality of led-out parts 22AY is bent. In this case, one or more, but not all, of the led-out parts 22AY are each bent once to include the non-bent part 22AY1 and the first bent part 22AY2, and the remaining one or more led-out parts 22AY are each bent twice to include the non-bent part 22AY1, the first bent part 22AY2, and the second bent part 22AY3. The plurality of led-out parts 22AY is bent in such a manner that each of the led-out parts 22AY overlaps and comes into contact with another one of the led-out parts 22AY adjacent thereto in the first bending direction D222.

Thereafter, the led-out parts 21AY are coupled to each other, and the led-out parts 22AY are coupled to each other. Here, the led-out parts 21AY are joined to each other by means of a method such as a welding method, and the led-out parts 22AY are joined to each other by means of a method such as a welding method. The welding method includes one or more kinds of welding methods including, without limitation, a laser welding method and a resistance welding method. Details of the welding method described here apply also to the following.

Thereafter, the positive electrode tab 30 (the tab parts 30A and 30B) and the negative electrode tab 40 (the tab parts 40A and 40B) are each coupled to the stacked body 120 (the led-out parts 21AY and 22AY). Here, the positive electrode tab 30 and the negative electrode tab 40 are each joined to the stacked body 120 by means of a method such as a welding method.

In this case, at the bottom part M1, the tab part 30A is coupled to the remaining one or more led-out parts 21AY that are bent twice, i.e., to the second bent part(s) 21AY3, and at the side wall part M3 (the taper surface M3T), the tab part 30B is coupled to the one or more led-out parts 21AY that are bent once, i.e., to the first bent part(s) 21AY2. Further, at the bottom part M2, the tab part 40A is coupled to the remaining one or more led-out parts 22AY that are bent twice, i.e., to the second bent part(s) 22AY3, and at the side wall part M3 (the taper surface M3T), the tab part 40B is coupled to the one or more led-out parts 22AY that are bent once, i.e., to the first bent part(s) 22AY2.

Thereafter, the stacked body 120 is placed into the outer package can 11 through the opening 11K. In this case, the positive electrode tab 30 (the tab part 30A) is coupled to the outer package can 11 (the bottom part 11M). Here, the tab part 30A is joined to the bottom part 11M by means of a method such as a welding method.

Thereafter, the outer package can 11 and the outer package cup 12 are disposed to allow the openings 11K and 12K to be opposed to each other, following which the outer package cup 12 is fitted to the outer package can 11 with the gasket 50 interposed therebetween. In this case, the opening 11K is covered with the bottom part 12M, and the sidewall part 12W is placed over the sidewall part 11W from an outer side. Further, the negative electrode tab 40 (the tab part 40A) is coupled to the outer package cup 12 (the bottom part 12M). Here, the tab part 40A is joined to the bottom part 12M by means of a method such as a welding method.

Thereafter, the sidewall parts 11W and 12W are crimped to each other with the gasket 50 interposed therebetween. The outer package cup 12 is thereby fixed to the outer package can 11 with the gasket 50 interposed therebetween. As a result, the battery can 10 is sealed and the stacked body 120 is enclosed inside the battery can 10.

Lastly, the electrolytic solution is injected into the battery can 10 through the unillustrated liquid injection hole, following which the liquid injection hole is sealed. This causes the stacked body 120 (the positive electrodes 21, the negative electrodes 22, and the separators 23) to be impregnated with the electrolytic solution, thereby fabricating the battery device 20. The battery device 20 is thus sealed inside the battery can 10. As a result, the secondary battery is completed.

According to the secondary battery, the positive electrode current collectors 21A (the led-out parts 21AY) are led out in the leading-out direction D211 from the respective positive electrodes 21 stacked over each other with the separators 23 interposed therebetween, and the led-out parts 21AY led out in the leading-out direction D211 include the respective first bent parts 21AY2 bent in the first bending direction D212. Further, each of the first bent parts 21AY2 overlaps and is in contact with another one of the first bent parts 21AY2 adjacent thereto in the first bending direction D212. Furthermore, one or more, but not all, of the first bent parts 21AY2 terminate at some middle point on the end face along the first bending direction D212 of the battery device 20, i.e., the taper surface M3T of the sidewall part M3. As a result, for a reason described below, it is possible to increase the energy density per unit volume.

Figure 7:
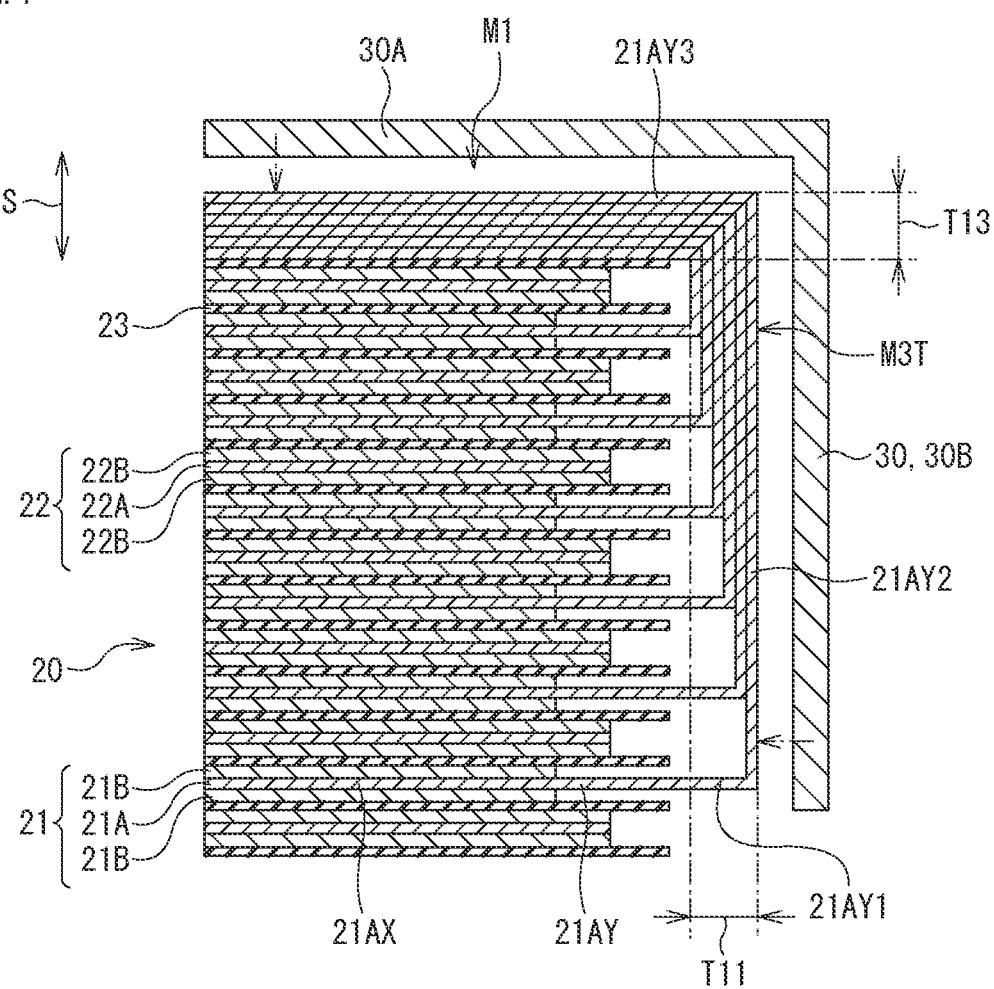
FIG. 7 is a sectional diagram for describing a configuration of a secondary battery of a comparative example.

FIG. 7 is a sectional view of a configuration of a secondary battery of a comparative example, and corresponds to FIG. 3. The secondary battery of the comparative example has a configuration similar to that of the secondary battery of the present embodiment (FIG. 3) except that, as illustrated in FIG. 7, all of the led-out parts 21AY in the positive electrodes 21 (the positive electrode current collectors 21A) are bent twice and therefore none of the first bent parts 21AY2 terminates at some middle point along the first bending direction D212, that is, none of the first bent parts 21AY2 terminates at some middle point on the end face along the first bending direction D212 of the battery device 20, i.e., the taper surface M3T of the sidewall part M3. Thus, all of the led-out parts 21AY each include the non-bent part 21AY1, the first bent part 21AY2, and the second bent part 21AY3.

In the secondary battery of the comparative example, all of the led-out parts 21AY are bent twice. Accordingly, as illustrated in FIG. 7, all of the led-out parts 21AY (the first bent parts 21AY2) overlap each other at the sidewall part M3 (the taper surface M3T) of the battery device 20. As a result, a total thickness (a maximum thickness) T11 of the first bent parts 21AY2 overlapping each other at the sidewall part M3 is markedly large. Here, the maximum thickness T11 is the sum of the respective thicknesses of six first bent parts 21AY2.

Here, a space occupied by the first bent parts 21AY2 at the sidewall part M3, that is, a space determined on the basis of the maximum thickness T11, is a space that is not available for containing the battery device 20 in the battery can 10, that is, a non-device space.

From the foregoing, the secondary battery of the comparative example is markedly large in maximum thickness T11 due to the configuration in which all of the first bent parts 21AY2 overlap each other at the sidewall part M3. This increases a volume of the non-device space (a non-device space volume). As a result, a space available for containing the battery device 20 in the battery can 10 (a device space) becomes small in volume (device space volume). Accordingly, it is difficult to increase the energy density per unit volume.

In contrast, according to the secondary battery of the present embodiment, one or more, but not all, of the led-out parts 21AY are bent once, and only the remaining one or more led-out parts 21AY are bent twice. As a result, as illustrated in FIG. 3, only some of the led-out parts 21AY (the first bent parts 21AY2) overlap each other at the sidewall part M3. Accordingly, a total thickness (a maximum thickness) T1 of the first bent parts 21AY2 overlapping each other at the sidewall part M3 is smaller than the maximum thickness T11 in the secondary battery of the comparative example. Here, the maximum thickness T1 is the sum of the respective thicknesses of almost three first bent parts 21AY2.

From the foregoing, the secondary battery of the present embodiment is smaller in maximum thickness T1 by virtue of the configuration in which only some of the first bent parts 21AY2 overlap each other at the sidewall part M3. This reduces the non-device space volume. As a result, the device space volume increases to make it possible to increase the energy density per unit volume.

Figure 8:
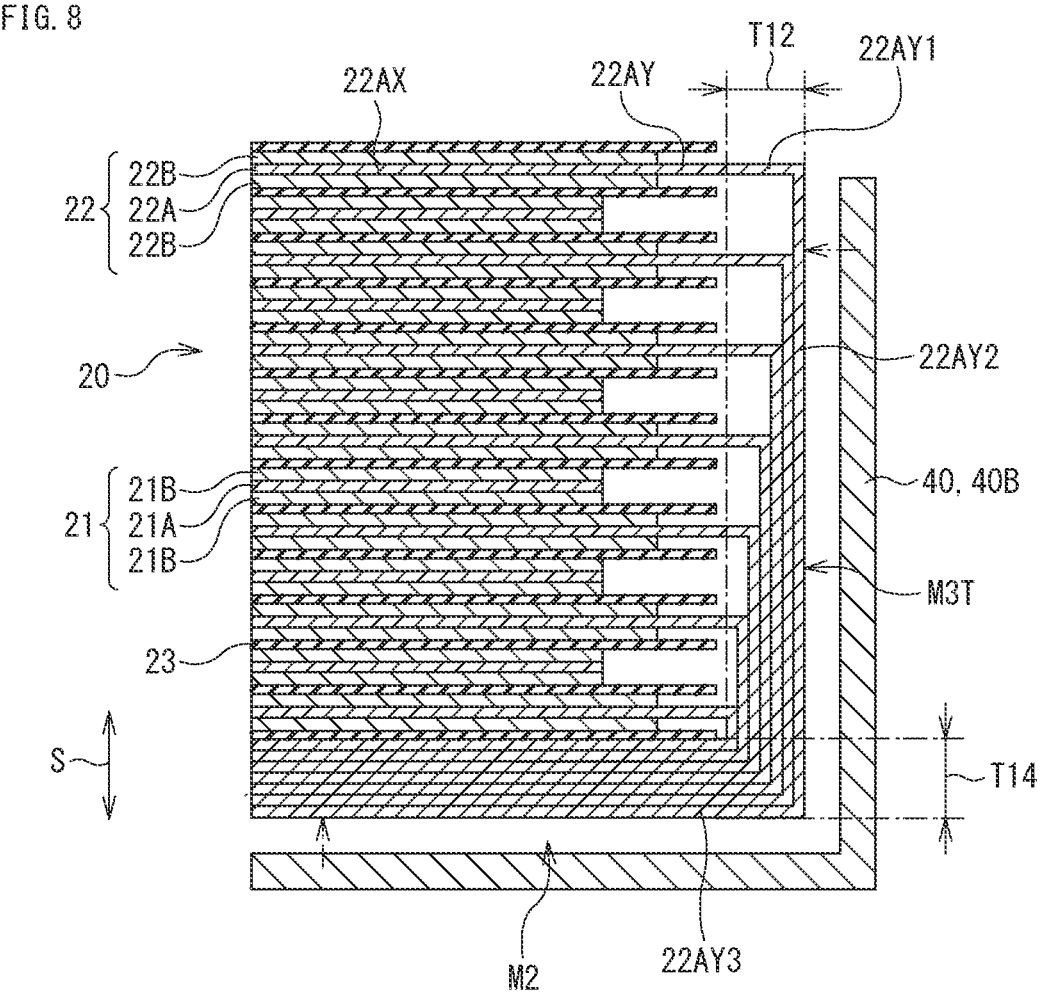
FIG. 8 is another sectional diagram for describing the configuration of the secondary battery of the comparative example.

The action and effects based on the configuration of the positive electrode 21 described here are similarly achievable also on the basis of the configuration of the negative electrode 22. More specifically, according to the secondary battery of the comparative example illustrated in FIG. 8 corresponding to FIG. 4, the led-out parts 22AY (the first bent parts 22AY2) overlap each other at the sidewall part M3, causing a maximum thickness T12 to be markedly large. This results in a greater non-device space volume and a smaller device space volume, causing also the energy density per unit volume to be smaller. In contrast, according to the secondary battery of the present embodiment illustrated in FIG. 4, only some of the led-out parts 22AY (the first bent parts 22AY2) overlap each other at the sidewall part M3, and therefore a maximum thickness T2 is smaller than the maximum thickness T12. This results in a smaller non-device space volume and a greater device space volume, causing also the energy density per unit volume to be greater. The secondary battery of the present embodiment thus makes it possible to achieve similar effects also in terms of the configuration of the negative electrode 22.

In addition, in the secondary battery of the present embodiment, the respective lengths of the positive electrode current collectors 21A may be equal. This allows for uniformization of respective electrical resistances of the positive electrodes 21 and allows a wiring structure using the positive electrode current collectors 21A described above to be provided easily without a need for changing the respective lengths of the positive electrode current collectors 21A. Accordingly, it is possible to achieve higher effects.

The action and effects based on the configuration of the positive electrode 21 described here are similarly achievable also on the basis of the configuration of the negative electrode 22. More specifically, the respective lengths of the negative electrode current collectors 22A may be equal. This allows for uniformization of respective electrical resistances of the negative electrodes 22 and allows a wiring structure using the negative electrode current collectors 22A described above to be provided easily. Accordingly, it is possible to achieve higher effects.

Further, the positions of the respective ends of the first bent parts 21AY2 that each terminate at some middle point along the first bending direction D212 may be gradually recessed toward the direction opposite to the first bending direction D212. In such a case, an increase in maximum thickness T1 is suppressed as compared with a case where the ends are located at the same position. This helps to prevent the non-device space volume from becoming smaller, and accordingly helps to increase the device space volume, making it possible to achieve higher effects.

The action and effects based on the configuration of the positive electrode 21 described here are similarly achievable also on the basis of the configuration of the negative electrode 22. More specifically, the positions of the respective ends of the first bent parts 22AY2 that each terminate at some middle point along the first bending direction D222 may be gradually recessed toward the direction opposite to the first bending direction D222. This suppresses an increase in maximum thickness T2, making it possible to achieve higher effects.

Further, one or more, but not all, of the led-out parts 21AY may each further include the second bent part 21AY3 bent in the second bending direction D213. This allows for a further increase in energy density per unit volume for a reason described below. Accordingly, it is possible to achieve even higher effects.

In the secondary battery of the comparative example (FIG. 7), all of the led-out parts 21AY are bent twice, and therefore all of the led-out parts 21AY (the second bent parts 21AY3) overlap each other at the bottom part M1 of the battery device 20. As a result, the total thickness of the second bent parts 21AY3 overlapping each other at the bottom part M1, i.e., a maximum thickness T13, is markedly large. The non-device space volume thus increases to reduce the device space volume. This results in a smaller energy density per unit volume.

In contrast, in the secondary battery of the present embodiment (FIG. 3), one or more, but not all, of the led-out parts 21AY are bent once, and only the other or remaining one or more of the led-out parts 21AY are bent twice. As a result, only some of the led-out parts 21AY (the second bent parts 21AY3) overlap each other at the bottom part M1. The total thickness of the second bent parts 21AY3 overlapping each other at the bottom part M1, i.e., a maximum thickness T3, is therefore smaller than the maximum thickness T13. This results in a smaller non-device space volume and accordingly a greater device space volume. The energy density per unit volume therefore increases.

From the foregoing, the secondary battery of the present embodiment achieves a further increase in energy density per unit volume not only in terms of the maximum thickness T1 at the sidewall part M3 but also in terms of the maximum thickness T3 at the bottom part M1. Accordingly, it is possible to achieve even higher effects.

The action and effects based on the configuration of the positive electrode 21 described here are similarly achievable also on the basis of the configuration of the negative electrode 22. More specifically, in the secondary battery of the comparative example (FIG. 7), all of the led-out parts 22AY (the second bent parts 22AY3) overlap each other at the bottom part M2, and a maximum thickness T14 is thus markedly large. In contrast, in the secondary battery of the present embodiment (FIG. 3), only some of the led-out parts 22AY (the second bent parts 22AY3) overlap each other at the bottom part M2, and therefore a maximum thickness T4 is smaller than the maximum thickness T14. This results in a smaller non-device space volume and a greater device space volume, thus allowing the energy density per unit volume to increase. Accordingly, it is possible to achieve even higher effects.

Further, in the secondary battery of the present embodiment, the positions of the respective ends of the second bent parts 21AY3 may be gradually recessed toward the direction opposite to the second bending direction D213. In such a case, an increase in maximum thickness T3 is suppressed as compared with a case where the ends are located at the same position. This helps to prevent the non-device space volume from becoming smaller, and accordingly helps to increase the device space volume, making it possible to achieve higher effects.

The action and effects based on the configuration of the positive electrode 21 described here are similarly achievable also on the basis of the configuration of the negative electrode 22. More specifically, the positions of the respective ends of the second bent parts 22AY3 may be gradually recessed toward the direction opposite to the second bending direction D223. This suppresses an increase in maximum thickness T4, making it possible to achieve higher effects.

Further, the positive electrode tab 30 may be coupled to each of the first bent parts 21AY2 and the second bent parts 21AY3. This allows the positive electrode current collectors 21A (the led-out parts 21AY) to be electrically coupled to each other easily and stably by means of the positive electrode tab 30. Accordingly, it is possible to achieve higher effects.

The action and effects based on the configuration of the positive electrode tab 30 described here are similarly achievable also on the basis of the configuration of the negative electrode tab 40. More specifically, the negative electrode tab 40 may be coupled to each of the first bent parts 22AY2 and the second bent parts 22AY3. This allows the negative electrode current collectors 22A (the led-out parts 22AY) to be electrically coupled to each other easily and stably by means of the negative electrode tab 40. Accordingly, it is possible to achieve higher effects.

Further, the bending direction (the first bending direction D212) of each of the led-out parts 21AY may be a direction away from the outer package cup 12 (the negative electrode terminal). This prevents a short circuit between the led-out parts 21AY having the positive polarity and the outer package cup 12 having the negative polarity, making it possible to achieve higher effects.

The action and effects based on the configuration of the led-out parts 21AY described here are similarly achievable also on the basis of the configuration of the led-out parts 22AY. More specifically, the bending direction (the first bending direction D222) of each of the led-out parts 22AY may be a direction away from the outer package can 11 (the positive electrode terminal). This prevents a short circuit between the led-out parts 22AY having the negative polarity and the outer package can 11 having the positive polarity, making it possible to achieve higher effects.

Further, the leading-out direction D211 in each of the positive electrodes 21 (the led-out parts 21AY) and the leading-out direction D221 in each of the negative electrodes 22 (the led-out parts 22AY) may be a common direction. This makes it easier for the secondary battery to be coupled to an electronic apparatus in that direction via the positive electrodes 21 and the negative electrodes 22. Accordingly, it is possible to achieve higher effects.

Further, the secondary battery may include the battery can 10 having a flat and columnar shape. In other words, the secondary battery may be a button-type secondary battery. In such a case, it is possible to achieve higher effects because the energy density per unit volume effectively increases in the small-sized secondary battery which is highly constrained in terms of size.

Next, a description will be given of a secondary battery according to a second embodiment of the technology.

In the secondary battery of the present embodiment, some of the plurality of positive electrode current collectors 21A (the positive electrode current collector 21A of an uppermost layer to be described later) and some of the plurality of negative electrode current collectors 22A (the negative electrode current collector 22A of a lowermost layer to be described later) are used to electrically couple the led-out parts 21AY to each other and to electrically couple the led-out parts 22AY to each other, unlike in the secondary battery of the first embodiment that uses the positive electrode tab 30 and the negative electrode tab 40 to electrically couple the led-out parts 21AY to each other and to electrically couple the lead-out parts 22AY to each other.

The secondary battery of the present embodiment has a configuration similar to that of the secondary battery of the first embodiment except for what is described below.

Figure 9:
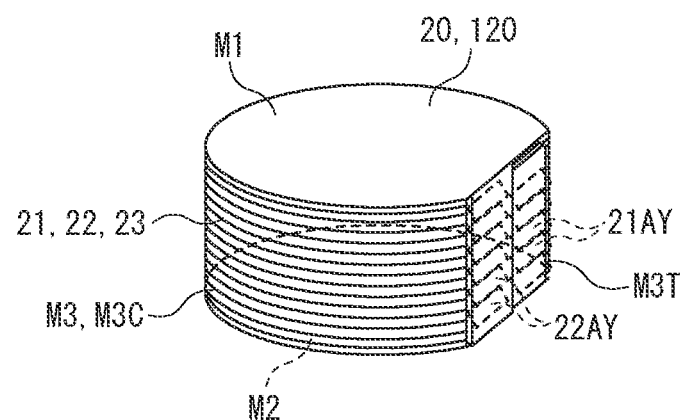
FIG. 9 is a perspective view of a configuration of a secondary battery according to a second embodiment of the technology.
Figure 10:
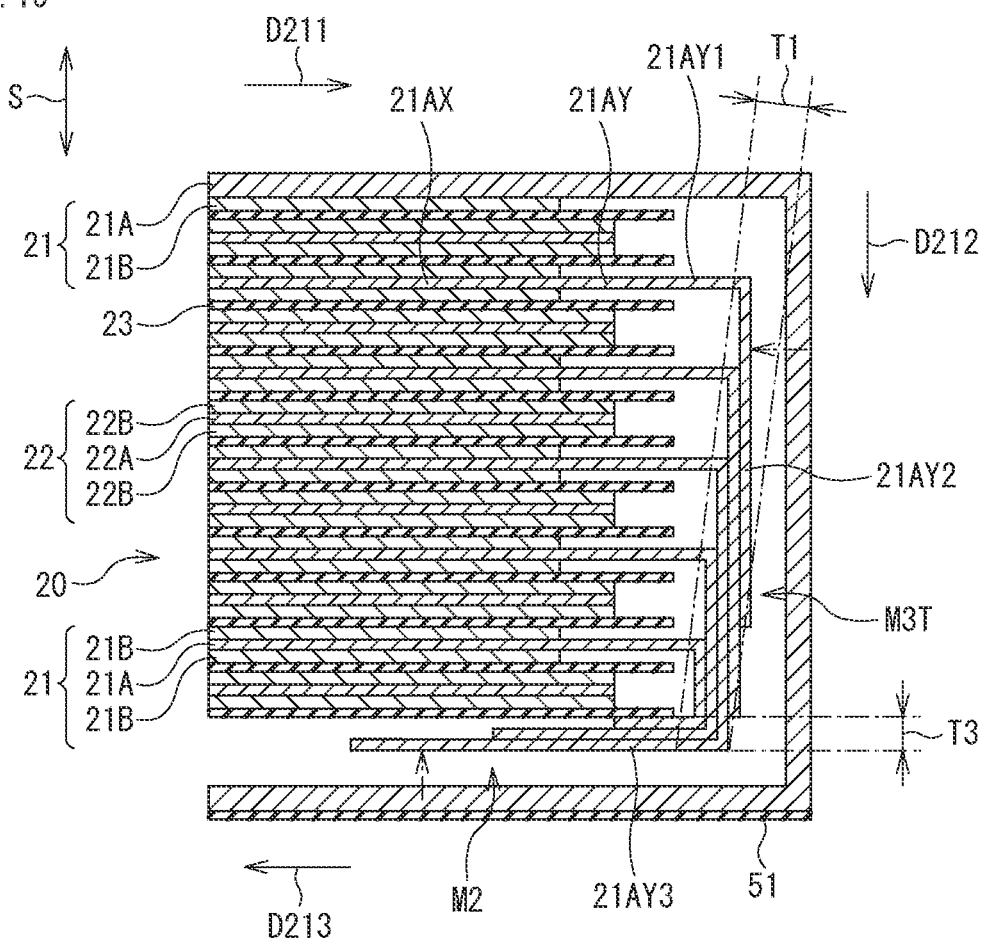
FIG. 10 is a sectional view of a configuration of a main part of the secondary battery illustrated in FIG. 9.
Figure 11:
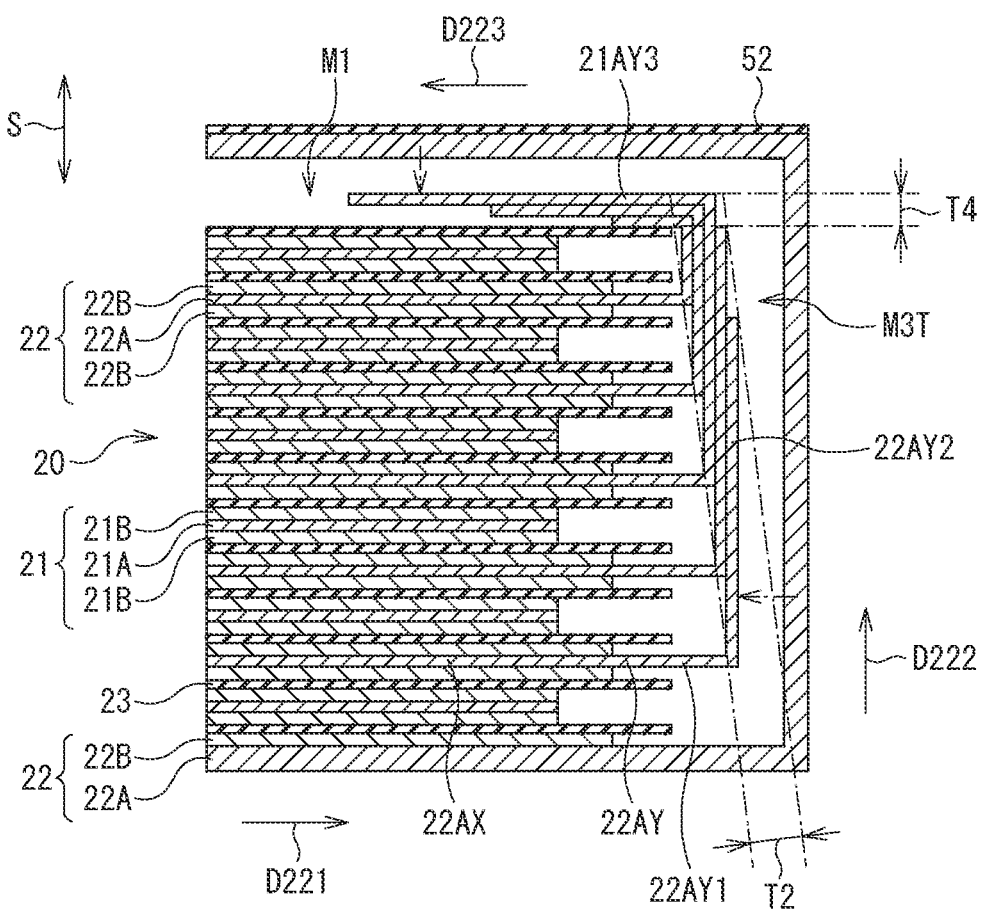
FIG. 11 is another sectional view of the configuration of the main part of the secondary battery illustrated in FIG. 9.

FIG. 9 is a perspective view of the configuration of the secondary battery of the present embodiment, and corresponds to FIG. 2. FIGS. 10 and 11 each illustrate a sectional configuration of a main part of the secondary battery of the present embodiment. It should be understood that FIG. 10 corresponds to FIG. 3, and FIG. 11 corresponds to FIG. 4. In each of FIGS. 9 to 11, the same components as those described in the first embodiment are denoted with the same reference signs.

For easy viewing of the coupling form of the led-out part 21AY of the lowermost layer, FIG. 10 illustrates a state where the led-out part 21AY of the lowermost layer is separated from the other led-out parts 21AY. For easy viewing of the coupling form of the led-out part 22AY of the uppermost layer, FIG. 11 illustrates a state where the led-out part 22AY of the uppermost layer is separated from the other led-out parts 22AY.

As illustrated in FIGS. 9 to 11, this secondary battery includes insulating layers 51 and 52 instead of the positive electrode tab 30 and the negative electrode tab 40. In the battery device 20, a plurality of positive electrodes 21 and a plurality of negative electrodes 22 are alternately stacked with the separators 23 interposed therebetween. The uppermost layer is one of the positive electrodes 21, and the lowermost layer is one of the negative electrodes 22.

The positive electrode 21 of the uppermost layer of the plurality of positive electrodes 21, that is, the positive electrode 21 closest to the outer package can 11 among the positive electrodes 21 stacked over each other in the stacking direction S, is an additional electrode as illustrated in FIG. 10. The positive electrode 21 of the uppermost layer includes the positive electrode current collector 21A (hereinafter referred to as "positive electrode current collector 21A of the uppermost layer") led out in the leading-out direction D211 (the right direction). This positive electrode current collector 21A is an additional current collector which also serves as the positive electrode tab 30.

In each of the positive electrodes 21 other than the positive electrode 21 of the uppermost layer, the positive electrode current collector 21A is led out in the leading-out direction D211 (the right direction) intersecting the stacking direction S, and includes the non-led-out part 21AX and the led-out part 21AY. The led-out part 21AY led out in the leading-out direction D211 is bent in the first bending direction D212 at some middle point. Here, the led-out part 21AY is bent in a direction away from the positive electrode 21 of the uppermost layer, i.e., in the down direction. In other words, the bending direction (the first bending direction D212) of the led-out part 21AY is opposite to the bending direction (the first bending direction D212) of the led-out part 21AY of the first embodiment. A reason for this is that, even if attempts are made to bend the led-out part 21AY in a direction closer to the outer package can 11, no space for the first bent part 21AY2 to be disposed therein lies in that direction and therefore there is no choice but to bend the led-out part 21AY in a direction opposite to that direction.

Each of the led-out parts 21AY bent in the first bending direction D212 overlaps and is in contact with another one of the led-out parts 21AY adjacent thereto (lying in front thereof) in the first bending direction D212, thus being coupled to the adjacent one of the led-out parts 21AY.

Here, of the plurality of led-out parts 21AY, one or more led-out parts 21AY that are located on the rear side in the first bending direction D212 are bent once and thus terminate at some middle point along the first bending direction D212. Accordingly, the one or more led-out parts 21AY each include the non-bent part 21AY1 and the first bent part 21AY2. The non-bent part 21AY1 extends in the leading-out direction D211. The first bent part 21AY2 extends in the first bending direction D212.

Here, in a case where five positive electrodes 21 (except the positive electrode 21 of the uppermost layer) and five negative electrodes 22 (except the negative electrode 22 of the lowermost layer) are alternately stacked with the separators 23 interposed therebetween, two led-out parts 21AY located on the rear side in the first bending direction D212 are bent once. Further, the positions of the respective ends of two first bent parts 21AY2 are gradually recessed toward the direction opposite to the first bending direction D212.

Besides, of the plurality of led-out parts 21AY, the remaining one or more led-out parts 21AY that are located on the front side in the first bending direction D212 are bent twice, and thus each include the non-bent part 21AY1, the first bent part 21AY2, and the second bent part 21AY3. The second bent part 21AY3 extends in the second bending direction D213.

Here, in the case where the five positive electrodes 21 (except the positive electrode 21 of the uppermost layer) and the five negative electrodes 22 (except the negative electrode 22 of the lowermost layer) are alternately stacked with the separators 23 interposed therebetween, three led-out parts 21AY located on the front side in the first bending direction D212 are bent twice. Further, the positions of the respective ends of three second bent parts 21AY3 are gradually recessed toward the direction opposite to the second bending direction D213.

In the positive electrode 21 of the uppermost layer, the positive electrode active material layer 21B is provided only on one side of the positive electrode current collector 21A of the uppermost layer, and therefore the positive electrode current collector 21A (the non-led-out part 21AX) of the uppermost layer is exposed at a side closer to the outer package can 11. However, the positive electrode active material layer 21B may be provided on each of both sides of the positive electrode current collector 21A of the uppermost layer; therefore, the positive electrode current collector 21A (the non-led-out part 21AX) of the uppermost layer need not necessarily be exposed at the side closer to the outer package can 11.

An end part (the led-out part 21AY) of the positive electrode current collector 21A of the uppermost layer is bent twice, and therefore includes the non-bent part 21AY1, the first bent part 21AY2, and the second bent part 21AY3. The first bent part 21AY2 and the second bent part 21AY3 are additional bent parts. As a result, the positive electrode current collector 21A of the uppermost layer is coupled to the remaining one or more led-out parts 21AY (the second bent part(s) 21AY3 of the led-out part(s) 21AY that are bent twice) of the plurality of led-out parts 21AY, and is also coupled to the one or more led-out parts 21AY (the first bent part(s) 21AY2 of the led-out part(s) 21AY that are bent once) of the plurality of led-out parts 21AY.

Besides, the positive electrode current collector 21A of the uppermost layer is coupled to the outer package can 11 (the bottom part 11M) at the non-led-out part 21AX and the led-out part 21AY (the non-bent part 21AY1). The outer package can 11 is thereby coupled to the other positive electrodes 21 (the positive electrode current collectors 21A) via the positive electrode current collector 21A of the uppermost layer which also serves as the positive electrode tab 30. The outer package can 11 thus serves as the positive electrode terminal.

It should be understood that there is no particular limitation on the thickness of the positive electrode current collector 21A of the uppermost layer which also serves as the positive electrode tab 30. The thickness of the positive electrode current collector 21A of the uppermost layer is preferably greater than the thickness of each of the other positive electrode current collectors 21A which do not also serve as the positive electrode tab 30, in particular. A reason for this is that this reduces the electrical resistance of the positive electrode current collector 21A of the uppermost layer, resulting in an improved electrical coupling characteristic of the positive electrode current collector 21A of the uppermost layer.

The plurality of negative electrodes 22 has a configuration similar to that of the plurality of positive electrodes 21 described above. More specifically, the negative electrode 22 of the lowermost layer of the plurality of negative electrodes 22, that is, the negative electrode 22 closest to the outer package cup 12 among the negative electrodes 22 stacked over each other in the stacking direction S, is another additional electrode as illustrated in FIG. 11. The negative electrode 22 of the lowermost layer includes the negative electrode current collector 22A (hereinafter referred to as "negative electrode current collector 22A of the lowermost layer") led out in the leading-out direction D221 (the right direction). This negative electrode current collector 22A is another additional current collector which also serves as the negative electrode tab 40.

In each of the negative electrodes 22 other than the negative electrode 22 of the lowermost layer, the negative electrode current collector 22A is led out in the leading-out direction D221 (the right direction) intersecting the stacking direction S, and includes the non-led-out part 22AX and the led-out part 22AY. The led-out part 22AY led out in the leading-out direction D221 is bent in the first bending direction D222 at some middle point. Here, the led-out part 22AY is bent in a direction away from the negative electrode 22 of the lowermost layer, i.e., in the up direction. In other words, the bending direction (the first bending direction D222) of the led-out part 22AY is opposite to the bending direction (the first bending direction D222) of the led-out part 22AY of the first embodiment. A reason for this is that, even if attempts are made to bend the led-out part 22AY in a direction closer to the outer package cup 12, no space for the first bent part 22AY2 to be disposed therein lies in that direction and therefore there is no choice but to bend the led-out part 22AY in a direction opposite to that direction.

Each of the led-out parts 22AY bent in the first bending direction D222 overlaps and is in contact with another one of the led-out parts 22AY adjacent thereto (lying in front thereof) in the first bending direction D222, thus being coupled to the adjacent one of the led-out parts 22AY.

Here, of the plurality of led-out parts 22AY, one or more led-out parts 22AY that are located on the rear side in the first bending direction D222 are bent once and thus terminate at some middle point along the first bending direction D222. Accordingly, the one or more led-out parts 22AY each include the non-bent part 22AY1 and the first bent part 22AY2. The non-bent part 22AY1 extends in the leading-out direction D221. The first bent part 22AY2 extends in the first bending direction D222.

Here, in the case where the five positive electrodes 21 (except the positive electrode 21 of the uppermost layer) and the five negative electrodes 22 (except the negative electrode 22 of the lowermost layer) are alternately stacked with the separators 23 interposed therebetween, two led-out parts 22AY located on the rear side in the first bending direction D222 are bent once. Further, the positions of the respective ends of two first bent parts 22AY2 are gradually recessed toward the direction opposite to the first bending direction D212.

Besides, of the plurality of led-out parts 22AY, the remaining one or more led-out parts 22AY that are located on the front side in the first bending direction D222 are bent twice, and thus each include the non-bent part 22AY1, the first bent part 22AY2, and the second bent part 22AY3. The second bent part 22AY3 extends in the second bending direction D223.

Here, in the case where the five positive electrodes 21 (except the positive electrode 21 of the uppermost layer) and the five negative electrodes 22 (except the negative electrode 22 of the lowermost layer) are alternately stacked with the separators 23 interposed therebetween, three led-out parts 22AY located on the front side in the first bending direction D222 are bent once. Further, the positions of the respective ends of three second bent parts 22AY3 are gradually recessed toward the direction opposite to the second bending direction D223.

In the negative electrode 22 of the lowermost layer, the negative electrode active material layer 22B is provided only on one side of the negative electrode current collector 22A of the lowermost layer, and therefore the negative electrode current collector 22A (the non-led-out part 22AX) of the lowermost layer is exposed at a side closer to the outer package cup 12. However, the negative electrode active material layer 22B may be provided on each of both sides of the negative electrode current collector 22A of the lowermost layer; therefore, the negative electrode current collector 22A (the non-led-out part 22AX) of the lowermost layer need not necessarily be exposed at the side closer to the outer package cup 12.

An end part (the led-out part 22AY) of the negative electrode current collector 22A of the lowermost layer is bent twice, and therefore includes the non-bent part 22AY1, the first bent part 22AY2, and the second bent part 22AY3. The first bent part 22AY2 and the second bent part 22AY3 are other additional bent parts. As a result, the negative electrode current collector 22A of the lowermost layer is coupled to the remaining one or more led-out parts 22AY (the second bent part(s) 22AY3 of the led-out part(s) 22AY that are bent twice) of the plurality of led-out parts 22AY, and is also coupled to the one or more led-out parts 22AY (the first bent part(s) 22AY2 of the led-out part(s) 22AY that are bent once) of the plurality of led-out parts 22AY.

Besides, the negative electrode current collector 22A of the lowermost layer is coupled to the outer package cup 12 (the bottom part 12M) at the non-led-out part 22AX and the led-out part 22AY (the non-bent part 22AY1). The outer package cup 12 is thereby coupled to the other negative electrodes 22 (the negative electrode current collectors 22A) via the negative electrode current collector 22A of the lowermost layer which also serves as the negative electrode tab 40. The outer package cup 12 thus serves as the negative electrode terminal.

It should be understood that there is no particular limitation on the thickness of the negative electrode current collector 22A of the lowermost layer which also serves as the negative electrode tab 40. The thickness of the negative electrode current collector 22A of the lowermost layer is preferably greater than the thickness of each of the other negative electrode current collectors 22A which do not also serve as the negative electrode tab 40, in particular. A reason for this is that this reduces the electrical resistance of the negative electrode current collector 22A of the lowermost layer, resulting in an improved electrical coupling characteristic of the negative electrode current collector 22A of the lowermost layer.

The insulating layer 51 is disposed between the positive electrode current collector 21A (the second bent part 21AY3) of the uppermost layer which also serves as the positive electrode tab 30 and the outer package cup 12, and prevents a short circuit between the second bent part 21AY3 and the outer package cup 12. The insulating layer 52 is disposed between the negative electrode current collector 22A (the second bent part 22AY3) of the lowermost layer which also serves as the negative electrode tab 40 and the outer package can 11, and prevents a short circuit between the second bent part 22AY3 and the outer package can 11. Each of the insulating layers 51 and 52 is an insulating resin tape. The resin tape includes one or more of insulating materials including, without limitation, a polymer material, such as polyimide, polyethylene terephthalate (PET), or poly olefin.

The secondary battery of the present embodiment performs operations (charging and discharging operations) similar to those of the secondary battery of the first embodiment. Upon charging and discharging, as the positive electrode current collector 21A of the uppermost layer also serves as the positive electrode tab 30, the other positive electrode current collectors 21A are electrically coupled to each other by means of the positive electrode current collector 21A of the uppermost layer, and as the negative electrode current collector 22A of the lowermost layer also serves as the negative electrode tab 40, the other negative electrode current collectors 22A are electrically coupled to each other by means of the negative electrode current collector 22A of the lowermost layer.

A method of manufacturing the secondary battery of the present embodiment is similar to the method of manufacturing the secondary battery of the first embodiment, except for what is described below.

In the case of fabricating the positive electrodes 21, the bending direction of the positive electrode current collectors 21A (the led-out parts 21AY) except the positive electrode current collector 21A of the uppermost layer is changed to the opposite direction, and the positive electrode current collector 21A (the led-out part 21AY) of the uppermost layer is bent twice in the same direction. Further, in the positive electrode 21 of the uppermost layer, the positive electrode active material layer 21B is formed only on one side of the positive electrode current collector 21A. In addition, the positive electrode current collector 21A of the uppermost layer is coupled to the other positive electrode current collectors 21A.

In the case of fabricating the negative electrodes 22, the bending direction of the negative electrode current collectors 22A (the led-out parts 22AY) except the negative electrode current collector 22A of the lowermost layer is changed to the opposite direction, and the negative electrode current collector 22A (the led-out part 22AY) of the lowermost layer is bent twice in the same direction. Further, in the negative electrode 22 of the lowermost layer, the negative electrode active material layer 22B is formed only on one side of the negative electrode current collector 22A. In addition, the negative electrode current collector 22A of the lowermost layer is coupled to the other negative electrode current collectors 22A.

In the case of assembling the secondary battery, the positive electrode current collector 21A of the uppermost layer is joined to the outer package can 11, and the negative electrode current collector 22A of the lowermost layer is joined to the outer package cup 12.

The secondary battery of the present embodiment has a configuration similar to that of the secondary battery of the first embodiment except that the positive electrode current collector 21A of the uppermost layer, instead of the positive electrode tab 30, is coupled to the other positive electrode current collectors 21A, and the negative electrode current collector 22A of the lowermost layer, instead of the negative electrode tab 40, is coupled to the other negative electrode current collectors 22A.

In this case, for a reason similar to that described in relation to the secondary battery of the first embodiment, the maximum thickness T1 becomes smaller than the maximum thickness T11, and the maximum thickness T2 becomes smaller than the maximum thickness T12, as compared with the secondary battery of the comparative example. This reduces the non-device space volume, thus increasing the device space volume. Accordingly, it is possible to increase the energy density per unit volume.

Further, by making the maximum thickness T3 smaller than the maximum thickness T13 and making the maximum thickness T4 smaller than the maximum thickness T14, the non-device space volume is further reduced and therefore a further increase in device space volume results. Accordingly, it is possible to further increase the energy density per unit volume.

Furthermore, coupling the positive electrode current collector 21A of the uppermost layer to the other positive electrode current collectors 21A allows the positive electrode current collector 21A of the uppermost layer to also serve as the positive electrode tab 30, and coupling the negative electrode current collector 22A of the lowermost layer to the other negative electrode current collectors 22A allows the negative electrode current collector 22A of the lowermost layer to also serve as the negative electrode tab 40. As a result, the positive electrode current collectors 21A are electrically coupled to each other and the negative electrode current collectors 22A are electrically coupled to each other even without the use of any separate positive electrode tab 30 or any separate negative electrode tab 40. Accordingly, it is possible to achieve higher effects.

In particular, the bending direction (the first bending direction D212) of each of the led-out parts 21AY may be a direction away from the positive electrode current collector 21A of the uppermost layer. In such a case, a space for disposing the first bent parts 21AY2 therein is secured. This allows for easy and stable bending of each of the led-out parts 21AY, making it possible to achieve higher effects.

The action and effects based on the configuration of the led-out parts 21AY described here are similarly achievable also on the basis of the configuration of the led-out parts 22AY. More specifically, the bending direction (the first bending direction D222) of each of the led-out parts 22AY may be a direction away from the negative electrode current collector 22A of the lowermost layer. This allows for easy and stable bending of each of the led-out parts 22AY, making it possible to achieve higher effects.

Further, the positive electrode current collector 21A of the uppermost layer may be exposed. This allows for easy coupling of the positive electrode current collector 21A of the uppermost layer to the outer package can 11, making it possible to achieve higher effects. In this case, because no positive electrode active material layer 21B is interposed between the positive electrode current collector 21A of the uppermost layer and the outer package can 11, it is possible to improve an electrical conductivity characteristic between the positive electrode current collector 21A of the uppermost layer and the outer package can 11.

The action and effects based on the configuration of the positive electrode current collector 21A of the uppermost layer described here are similarly achievable also on the basis of the configuration of the negative electrode current collector 22A of the lowermost layer. More specifically, the negative electrode current collector 22A of the lowermost layer may be exposed. This allows for easy coupling of the negative electrode current collector 22A of the lowermost layer to the outer package cup 12, making it possible to achieve higher effects. Needless to say, this also makes it possible to improve an electrical conductivity characteristic between the negative electrode current collector 22A of the lowermost layer and the outer package cup 12.

For the secondary battery of the first embodiment (FIGS. 1 to 4) and the secondary battery of the comparative example (FIGS. 7 and 8), the respective device space volumes (mm³) were logically (mathematically) calculated, and the calculated device space volumes were compared with each other. Table 1 provides the results obtained.

The "Configuration" column in Table 1 indicates the kinds of the secondary batteries. More specifically, "Comparative" represents the secondary battery of the comparative example, and "Embodiment" represents the secondary battery of the first embodiment.

Conditions for calculating the device space volumes were as follows. Various dimensions of the battery device 20, i.e., the number of the positive electrodes 21 stacked, the number of the negative electrodes 22 stacked, a thickness (μm) of the positive electrode current collector 21A, a maximum overlap thickness (μm) of the positive electrode current collectors 21A, a thickness (μm) of the negative electrode current collector 22A, and a maximum overlap thickness (μm) of the negative electrode current collectors 22A were set as listed in Table 1. Here, attention was focused on the maximum thicknesses T1, T2, T11, and T12 as parameters influencing the device space volume; therefore, the maximum overlap thickness of the positive electrode current collectors 21A was taken as the maximum thickness T1 or T11, and the maximum overlap thickness of the negative electrode current collectors 22A was taken as the maximum thickness T2 or T12. In other words, for the sake of convenience, neither the thickness of the positive electrode tab 30 nor the thickness of the negative electrode tab 40 was taken into account.

The battery can 10 has a flat and generally cylindrical three-dimensional shape with the sidewall part M3 (the taper surface M3T). The battery can 10 thus has a generally cylindrical internal space for the battery device 20 to be contained therein. Various dimensions of the battery can 10 were set as follows: the outer diameter D=12.1 mm and the height H=4.0 mm (the number of the positive electrodes 21 stacked=the number of the negative electrodes 22 stacked=15); or the outer diameter D=12.1 mm and the height H=5.4 mm (the number of the positive electrodes 21 stacked=20, and the number of the negative electrodes 22 stacked=20). Further, a recess distance of the taper surface M3T was set to 1.8 mm.

To calculate the device space volume, first, a maximum volume of the internal space (the cylindrical space), that is, a space volume (mm³), of the battery can 10 was calculated on the basis of the outer diameter D and the height H of the battery can 10. For the sake of convenience, the thickness (wall thickness) of the battery can 10 was not taken into account in calculating the space volume. Thereafter, the non-device space volume (mm³) was calculated on the basis of the number of the positive electrodes 21 stacked, the number of the negative electrodes 22 stacked, the thickness of the positive electrode current collector 21A, the maximum overlap thickness of the positive electrode current collectors 21A, the thickness of the negative electrode current collector 22A, and the maximum overlap thickness of the negative electrode current collectors 22A. Lastly, the non-device space volume was subtracted from the space volume to thereby calculate the device space volume. The device space volume corresponds to an area of the plan shape of the negative electrode 22 (excluding a portion where the negative electrode current collectors 22A overlap each other) multiplied by the height of the battery device 20. As described above, the height H of the battery can 10 was varied to be of two different values, and thereby the number of the positive electrodes 21 stacked and the number of the negative electrodes 22 stacked were also each varied to be of two different values, as listed in Table 1.

For easy understanding of an influence of the difference in device space volume, Table 1 also lists battery capacity (mAh). The battery capacity is one that is obtainable in a case of increasing the area of each of the positive electrodes 21 and the negative electrodes 22 to its maximum without changing the number of each of the positive electrodes 21 and the negative electrodes 22 stacked.

TABLE 1

| Configuration | Positive electrode Number stacked | Negative electrode Number stacked | Positive electrode current collector | | Negative electrode current collector | | Device space volume (mm³) | Battery capacity (mAh) |
| --- | --- | --- | --- | --- | --- | --- | --- | --- |
| | | | Thickness (μm) | Maximum overlap thickness (μm) | Thickness (μm) | Maximum overlap thickness (μm) | | |
| Comparative | 15 | 15 | 12 | 180 | 10 | 150 | 47.9 | 50.3 |
| Embodiment | 15 | 15 | 12 | 48 | 10 | 100 | 49.8 | 53.1 |
| Comparative | 20 | 20 | 12 | 240 | 10 | 200 | 66.0 | 69.8 |
| Embodiment | 20 | 20 | 12 | 48 | 10 | 100 | 69.8 | 75.5 |

As indicated in Table 1, the device space volume varied depending on the configuration of the secondary battery. Specifically, the secondary battery of the comparative example was smaller in device space volume. This is attributable to a greater non-device space volume resulting from each of the maximum overlap thickness of the positive electrode current collectors 21A and the maximum overlap thickness of the negative electrode current collectors 22A being markedly large. In contrast, the secondary battery of the embodiment was greater in device space volume. This is attributable to a smaller non-device space volume resulting from each of the maximum overlap thickness of the positive electrode current collectors 21A and the maximum overlap thickness of the negative electrode current collectors 22A being greatly reduced as compared with the secondary battery of the comparative example.

The results presented in Table 1 indicate that, as compared with the secondary battery of the comparative example, the secondary battery of the embodiment achieves an increased device space volume owing to a reduction in non-device space volume in terms of the electrical coupling form of each of the positive electrode current collectors 21A and the negative electrode current collectors 22A. As a result, an increased energy density per unit volume is achieved.

Next, modifications of the foregoing secondary battery will be described. The configuration of the secondary battery is appropriately modifiable, as will be described below. It should be understood that any two or more of the following series of modifications may be combined.

[Modification 1]

In the first embodiment (FIGS. 3 and 4), the remaining one or more of the plurality of led-out parts 21AY include the respective second bent parts 21AY3, and the remaining one or more of the plurality of led-out parts 22AY include the respective second bent parts 22AY3.

However, the remaining one or more of the plurality of led-out parts 21AY need not necessarily include the respective second bent parts 21AY3, and the remaining one or more of the plurality of led-out parts 22AY need not necessarily include the respective second bent parts 22AY3. Needless to say, a case is possible in which the remaining one or more of the plurality of led-out parts 21AY include the respective second bent parts 21AY3 whereas the remaining one or more of the plurality of led-out parts 22AY include no second bent parts 22AY3; alternatively, a case is possible in which the remaining one or more of the plurality of led-out parts 21AY include no second bent parts 21AY3 whereas the remaining one or more of the plurality of led-out parts 22AY include the respective second bent parts 22AY3.

In these cases also, as described above, the device space volume increases owing to the maximum thicknesses T1 and T2 being smaller than the maximum thicknesses T11 and T12, respectively. Accordingly, it is possible to achieve similar effects. However, in order to achieve a greatest possible electrical coupling area and a greatest possible device space volume, it is preferable that the remaining one or more of the plurality of led-out parts 21AY include the respective second bent parts 21AY3 and the remaining one or more of the plurality of led-out parts 22AY include the respective second bent parts 22AY3 to make the maximum thicknesses T3 and T4 smaller than the maximum thicknesses T13 and T14, respectively.

Although not specifically illustrated here, Modification 1 described here may be applied to the second embodiment (FIGS. 10 and 11). In this case also, it is possible to achieve similar effects owing to the maximum thicknesses T1 and T2 being smaller than the maximum thicknesses T11 and T12, respectively.

[Modification 2]

In the first embodiment (FIG. 2), the battery device 20 has one taper surface M3T, and the led-out parts 21AY and 22AY are each disposed at the sidewall part M3 (the taper surface M3T). As a result, the led-out parts 21AY and 22AY are disposed to be adjacent to each other, and accordingly, the tab part 30B of the positive electrode tab 30 and the tab part 40B of the negative electrode tab 40 are disposed to be adjacent to each other. In this case, the leading-out direction D211 in the positive electrodes 21 (the led-out parts 21AY) and the leading-out direction D221 in the negative electrodes 22 (the led-out parts 22AY) are a common direction.

Figure 12:
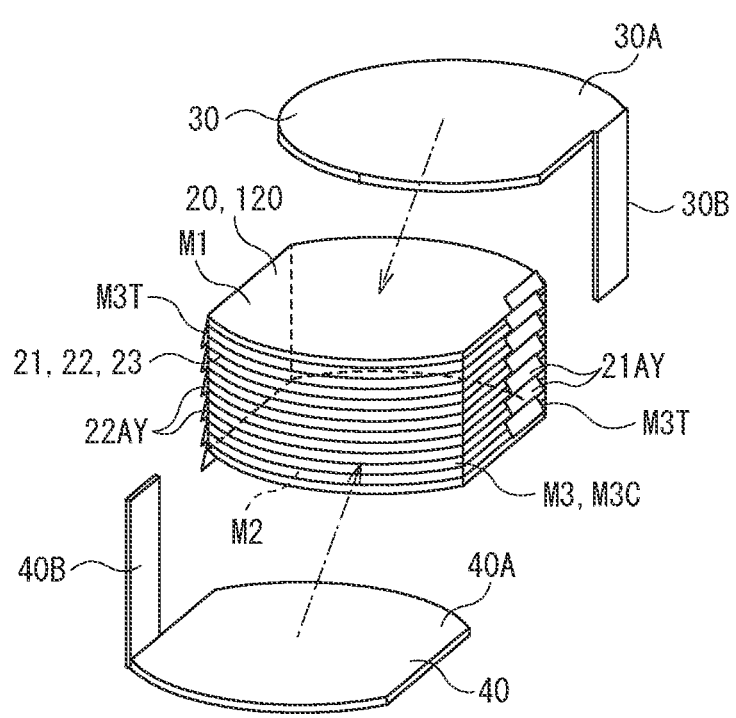
FIG. 12 is a perspective view of a configuration of a secondary battery according to an embodiment of the technology.

However, as illustrated in FIG. 12 corresponding to FIG. 2, the battery device 20 may have two taper surfaces M3T disposed opposite to each other, with the led-out parts 21AY being disposed on one sidewall part M3 (taper surface M3T) and the led-out parts 22AY being disposed on the other sidewall part M3 (taper surface M3T). The led-out parts 21AY and 22AY may thus be disposed opposite to each other and accordingly, the tab part 30B of the positive electrode tab 30 and the tab part 40B of the negative electrode tab 40 may be disposed opposite to each other. In this case, the leading-out direction D211 in the positive electrodes 21 (the led-out parts 21AY) and the leading-out direction D221 in the negative electrodes 22 (the led-out parts 22AY) are opposite to each other.

In this case also, it is possible for the positive electrode tab 30 to electrically couple the led-out parts 21AY to each other, and it is possible for the negative electrode tab 40 to electrically couple the led-out parts 22AY to each other. Accordingly, it is possible to achieve similar effects. In this case, in particular, by making use of the configuration in which respective positions of the positive electrode tab 30 and the negative electrode tab 40 are opposite to each other, it is possible to increase flexibility for the coupling form of the secondary battery to an electronic apparatus.

Although not specifically illustrated here, Modification 2 described here may be applied to the second embodiment (FIG. 9). More specifically, the positive electrode current collector 21A (the led-out part 21AY) of the uppermost layer which also serves as the positive electrode tab 30 may be disposed at one side wall part M3 (taper surface M3T), and the negative electrode current collector 22A (the led-out part 22AY) of the lowermost layer which also serves as the negative electrode tab 40 may be disposed at the other side wall part M3 (taper surface M3T). In this case also, it is possible to achieve similar effects.

[Modification 3]

In the first embodiment (FIGS. 1 and 2), the positive electrode tab 30 includes the tab part 30A having a generally circular shape and the tab part 30B having a strip-like shape, and the negative electrode tab 40 includes the tab part 40A having a generally circular shape and the tab part 40B having a strip-like shape. However, the configuration of each of the positive electrode tab 30 and the negative electrode tab 40 is not particularly limited as long as it is possible for the positive electrode tab 30 to electrically couple the positive electrode current collectors 21A to each other and it is possible for the negative electrode tab 40 to electrically couple the negative electrode current collectors 22A to each other.

Figure 13:
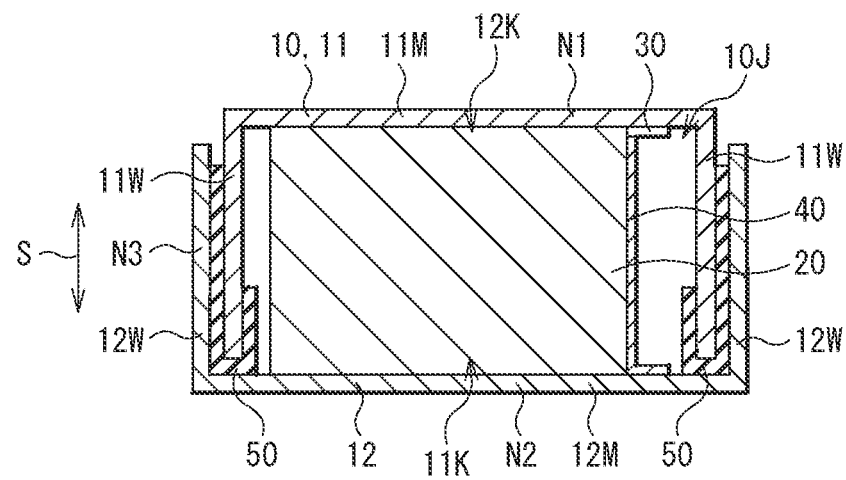
FIG. 13 is a sectional view of a configuration of a secondary battery according to an embodiment of the technology.
Figure 14:
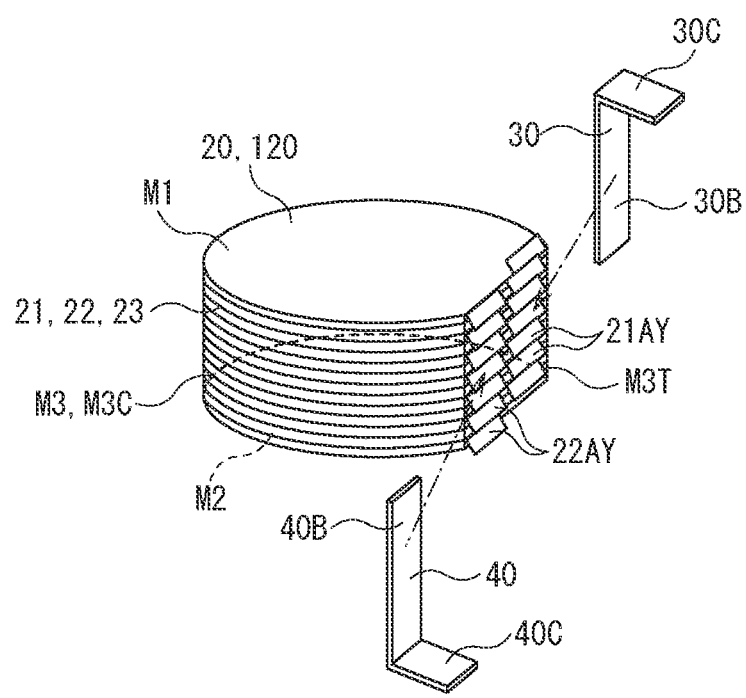
FIG. 14 is a perspective view of the configuration of the secondary battery illustrated in FIG. 13.

Specifically, as illustrated in FIG. 13 corresponding to FIG. 1 and in FIG. 14 corresponding to FIG. 2, the positive electrode tab 30 may include a tab part 30C having a strip-like shape instead of the tab part 30A having a generally circular shape, and the negative electrode tab 40 may include a tab part 40C having a strip-like shape instead of the tab part 40A having a generally circular shape.

The tab part 30C extends in a direction away from the battery device 20. The positive electrode tab 30 thus has a three-dimensional shape that is bent in the direction away from the battery device 20 at some middle point. Although not particularly limited, an angle at which the positive electrode tab 30 is bent (an angle defined by the tab parts 30B and 30C) is, e.g., 90°.

The tab part 40C has a configuration similar to that of the tab part 30C described above. More specifically, the tab part 40C extends in a direction away from the battery device 20. The negative electrode tab 40 thus has a three-dimensional shape that is bent in the direction away from the battery device 20 at some middle point. Although not particularly limited, an angle at which the negative electrode tab 40 is bent (an angle defined by the tab parts 40B and 40C) is, e.g., 90°.

The positive electrode tab 30 is coupled to the outer package can 11 at the tab part 30C, and the outer package can 11 thus serves as the positive electrode terminal. The negative electrode tab 40 is coupled to the outer package cup 12 at the tab 40 part C, and the outer package cup 12 thus serves as the negative electrode terminal.

In this case also, it is possible for the positive electrode tab 30 to electrically couple the led-out parts 21AY to each other, and it is possible for the negative electrode tab 40 to electrically couple the led-out parts 22AY to each other. Accordingly, it is possible to achieve similar effects.

However, in a case of using the tab part 30C that is shaped like a strip and small in area, a contact area between the tab part 30C and the outer package can 11 becomes smaller, and this can result in an increase in electrical resistance of the positive electrode tab 30. In order to achieve a lowest possible electrical resistance of the positive electrode tab 30, it is thus preferable that the positive electrode tab 30 include the tab part 30A that is generally circular in shape and large in area. A reason for this is that this allows for a large contact area between the tab part 30A and the outer package can 11 and consequently reduces the electrical resistance of the positive electrode tab 30.

The action and effects based on the configuration of the positive electrode tab 30 (the tab part 30C) described here are similarly achievable also on the basis of the configuration of the negative electrode tab 40 (the tab part 40C). In other words, similar effects are achievable also in the case where the negative electrode tab 40 includes the tab part 40C, and it is preferable that the negative electrode tab 40 include the tab part 40A in order to reduce the electrical resistance of the negative electrode tab 40.

It should be understood that in the case of using the tab parts 30C and 40C, it is necessary to provide an excess space 10J, as illustrated in FIG. 13, for disposing the tab parts 30C and 40C inside the battery can 10. The excess space 10J is a space that is not available for disposing the battery device 20 therein, that is, a non-device space, resulting in a smaller device space volume. In contrast, in the case of using the tab parts 30A and 30B, as illustrated in FIG. 1, hardly any excess space 10J is involved and therefore the device space volume increases. In order to achieve a greater device space volume, it is thus preferable to use the tab parts 30A and 30B rather than the tab parts 30C and 40C.

Needless to say, although not specifically illustrated here, the positive electrode tab 30 including the tab part 30A and the negative electrode tab 40 including the tab part 40C may be used in combination, or the positive electrode tab 30 including the tab part 30C and the negative electrode tab 40 including the tab part 40A may be used in combination. In these cases also, it is possible to achieve similar effects.

[Modification 4]

In the process of manufacturing the secondary battery, the stacked body 120 is placed into the outer package can 11, and the outer package can 11 and the outer package cup 12 (the sidewall parts 11W and 12S) are crimped to each other, following which the electrolytic solution is injected into the battery can 10 (the outer package can 11 and the outer package cup 12) through the liquid injection hole. In other words, the stacked body 120 is impregnated with the electrolytic solution by injecting the electrolytic solution into the battery can 10 after the battery can 10 is formed.

However, the outer package can 11 and the outer package cup 12 may be crimped to each other after the stacked body 120 is placed into the outer package can 11 and the electrolytic solution is injected into the outer package can 11. In other words, the stacked body 120 may be impregnated with the electrolytic solution by injecting the electrolytic solution into the outer package can 11 before the battery can 10 is formed. In this case, the battery can 10 does not have to be provided with the liquid injection hole.

In this case also, the battery device 20 is fabricated by impregnation of the stacked body 120 with the electrolytic solution, and the battery device 20 is sealed inside the battery can 10. Accordingly, it is possible to achieve similar effects. In this case, in particular, it is possible to simplify the configuration of the battery can 10 because it is unnecessary for the battery can 10 to have the liquid injection hole. Further, because the electrolytic solution is injected into the outer package can 11 through an opening having an opening area larger than that of the liquid injection hole, it is possible to improve efficiency of injection of the electrolytic solution for the stacked body 120, and to simplify the process of injecting the electrolytic solution.

[Modification 5]

In the first embodiment (FIG. 1), the battery can 10 is a battery can of a crimped type; however, the battery can 10 is not limited to a particular kind.

Figure 15:
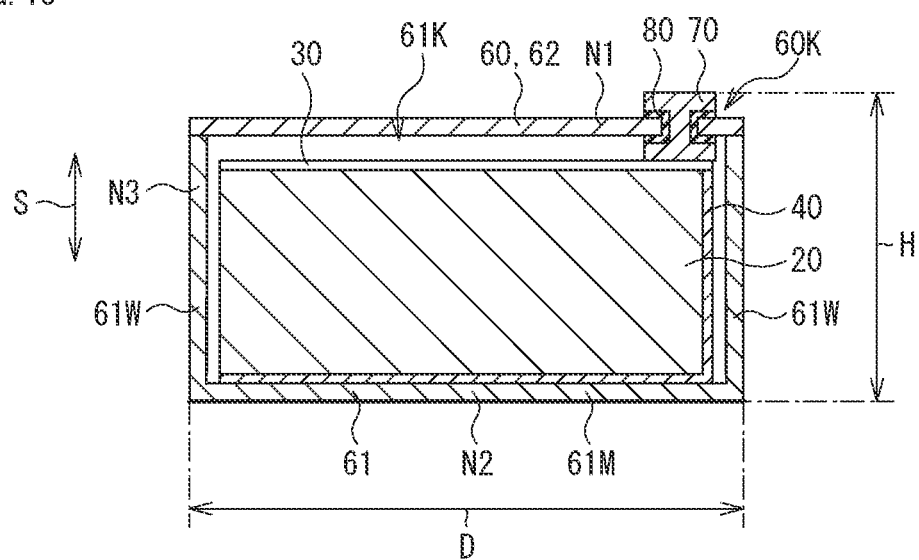
FIG. 15 is a sectional view of a configuration of a secondary battery according to an embodiment of the technology.

Specifically, as illustrated in FIG. 15 corresponding to FIG. 1, a battery can 60 of a welded type may be used instead of the battery can 10 of the crimped type. The battery can 60 includes an outer package can 61 and an outer package cover 62. The secondary battery using the battery can 60 has a configuration similar to that of the secondary battery illustrated in FIG. 1 except that an electrode terminal 70 and a gasket 80 are provided in addition.

The outer package can 61 has a configuration similar to that of the outer package can 11. More specifically, the outer package can 61 includes a bottom part 61M, a sidewall part 61W, and an opening 61K, and contains the battery device 20 inside. The negative electrode tab 40 is coupled to the outer package can 61 (the bottom part 61M), and the outer package can 61 thus serves as the negative electrode terminal. Accordingly, the outer package can 61 includes a material similar to the material included in the negative electrode tab 40.

The outer package cover 62 is a plate-shaped member that seals the opening 61K of the outer package can 61, and is joined to the outer package can 61 by means of a method such as a welding method. The outer package cover 62 is thereby firmly coupled to the outer package can 61, and is not separable from the outer package can 61 after being joined thereto. The outer package cover 62 has a through hole 60K, and the electrode terminal 70 is attached to the through hole 60K with the gasket 80 interposed therebetween.

The positive electrode tab 30 is coupled to the electrode terminal 70, and the electrode terminal 70 thus serves as the positive electrode terminal. Accordingly, the electrode terminal 70 includes a material similar to the material included in the positive electrode tab 30. The electrode terminal 70 extends from the inside of the battery can 60 to the outside of the battery can 60 via the through hole 60K, and has a generally cylindrical three-dimensional shape with an outer diameter thereof locally reduced inside the through hole 60K. However, the electrode terminal 70 may have another three-dimensional shape such as a generally polygonal prismatic shape. The gasket 80 is disposed between the battery can 60 and the electrode terminal 70, and includes one or more of insulating materials including, without limitation, polypropylene and polyethylene.

In a process of manufacturing the secondary battery using the battery can 60 of the welded type, the electrolytic solution may be injected into the battery can 60 (the outer package can 61 and the outer package cover 62) through the liquid injection hole after the stacked body 120 is placed into the outer package can 61 and the outer package cover 62 is joined to the outer package can 61 by means of a method such as a welding method. In other words, the stacked body 120 may be impregnated with the electrolytic solution by injecting the electrolytic solution into the battery can 60 after the battery can 60 is formed, that is, after the outer package cover 62 is joined to the outer package can 61.

Alternatively, the outer package cover 62 may be joined to the outer package can 61 by means of a method such as a welding method after the stacked body 120 is placed into the outer package can 61 and the electrolytic solution is injected into the outer package can 61. In other words, the stacked body 120 may be impregnated with the electrolytic solution by injecting the electrolytic solution into the outer package can 61 before the battery can 60 is formed, that is, before the outer package cover 62 is joined to the outer package can 61. In this case, the battery can 60 does not have to be provided with the liquid injection hole.

In this case also, the device space volume increases to increase the energy density per unit volume. Accordingly, it is possible to achieve similar effects. In this case, the absence of the crimp part C allows the increase in device space volume to be greater accordingly than in the case of using the battery can 10 of the crimped type, thus making it possible to achieve higher effects.

It should be understood that in the case of using the battery can 60 of the welded type, a portion of the electrode terminal 70 is placed inside the battery can 60 and therefore the device space volume decreases by a volume based on the height of the portion of the electrode terminal 70. However, the decrease in device space volume resulting from the portion of the electrode terminal 70 is sufficiently smaller than a decrease in device space volume resulting from the presence of the crimp part C. Accordingly, the use of the battery can 60 of the welded type increases the device space volume as compared with the case of using the battery can 10 of the crimped type, thus making it possible to achieve further higher effects.

In particular, in a case where the electrolytic solution is injected into the outer package can 61 before the battery can 60 is formed, it is unnecessary to provide the battery can 60 with the liquid injection hole, and therefore it is possible to simplify the configuration of the battery can 60. Furthermore, because the electrolytic solution is injected into the outer package can 61 through the opening having an opening area larger than that of the liquid injection hole, it is possible to improve efficiency of injection of the electrolytic solution for the stacked body 120, and it is also possible to simplify the process of injecting the electrolytic solution.

Although not specifically illustrated here, Modification 4 described here may be applied to the second embodiment. More specifically, the battery can 60 of the welded type may be used in the case where the positive electrode current collector 21A of the uppermost layer also serves as the positive electrode tab 30 and the negative electrode current collector 22A of the lowermost layer also serves as the negative electrode tab 40. This makes it possible to achieve similar effects.

[Modification 6]

Also in the case of using the battery can 60 of the welded type described above, as described in Modification 3, there is no particular limitation on the configuration of each of the positive electrode tab 30 and the negative electrode tab 40.

Figure 16:
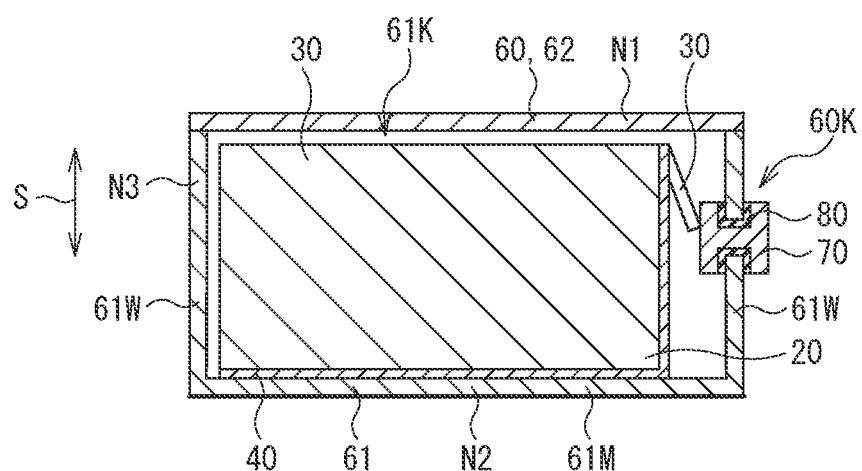
FIG. 16 is a sectional view of a configuration of a secondary battery according to an embodiment of the technology.
Figure 17:
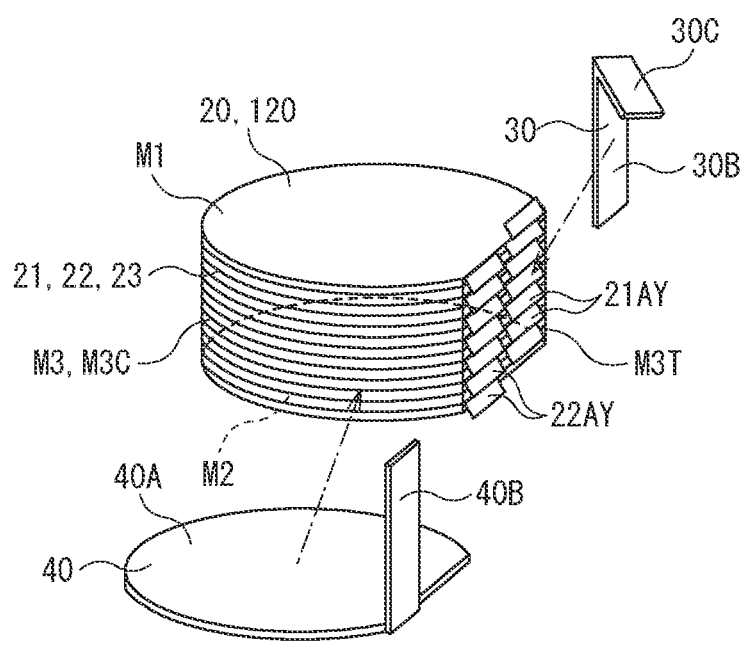
FIG. 17 is a perspective view of the configuration of the secondary battery illustrated in FIG. 16.

Specifically, as illustrated in FIG. 16 corresponding to FIG. 15 and in FIG. 17 corresponding to FIG. 2, the positive electrode tab 30 including the tab part 30C and the negative electrode tab 40 including the tab part 40A may be combined. In this case, the attachment position of the electrode terminal 70 on the battery can 60 may be changed depending on the combination of the positive electrode tab 30 and the negative electrode tab 40 described above.

Here, the battery can 60 has the through hole 60K at the outer package can 61 (the sidewall part 61W) instead of the outer package cover 62 (a bottom part 62M), and the electrode terminal 70 is therefore attached to the through hole 60K provided at the sidewall part 61W, with the gasket 80 interposed between the electrode terminal 70 and the through hole 60K.

The positive electrode tab 30 includes the tab parts 30B and 30C as described above, and is thus bent at some middle point. Here, the positive electrode tab 30 is bent at an angle of less than 90°. The positive electrode tab 30 is thereby coupled to the electrode terminal 70, and the electrode terminal 70 thus serves as the positive electrode terminal.

In this case also, the device space volume increases to increase the energy density per unit volume. Accordingly, it is possible to achieve similar effects.

Although the technology has been described above with reference to some embodiments and examples, configurations of the technology are not limited to those described with reference to the embodiments and examples above, and are therefore modifiable in a variety of ways.

Specifically, while a description has been given of a case where the electrode reactant is lithium, the electrode reactant is not particularly limited. Specifically, the electrode reactant may be, as described above, another alkali metal, such as sodium or potassium, or may be an alkaline earth metal, such as beryllium, magnesium, or calcium. Other than the above, the electrode reactant may be another light metal, such as aluminum.

The effects described herein are mere examples. Therefore, the effects of the technology are not limited to the effects described herein. Accordingly, the technology may achieve any other effect.

It should be understood by those skilled in the art that various modifications, combinations, sub-combinations, and alterations may occur depending on design requirements and other factors. Such changes and modifications can be made without departing from the spirit and scope of the present subject matter and without diminishing its intended advantages. It is therefore intended that such changes and modifications be covered by the appended claims.

The invention claimed is:

1. A secondary battery comprising a power generation element including a plurality of electrodes, the electrodes being stacked on each other in a stacking direction with a separator interposed therebetween, wherein
  each of the electrodes includes a current collector led out in a first direction intersecting the stacking direction,
  each of a plurality of the current collectors led out in the first direction includes an end part, wherein the end part includes a first bent part that is bent in a second direction intersecting the first direction, each of a plurality of the first bent parts overlaps and is in contact with an adjacent first bent part in the second direction, at least one of the first bent parts terminates at a middle point on an end face along the second direction of the power generation element, and wherein the end part of each of one or more, but not all, of the current collectors led out in the first direction further includes a second bent part that is coupled to the first bent part and bent in a third direction to be along the power generation element, and wherein the third direction is opposite to the first direction.

2. The secondary battery according to claim 1, wherein respective lengths of the current collectors are equal.

3. The secondary battery according to claim 1, wherein the first bent parts each terminate at the middle point on the end face along the second direction, and positions of respective ends of the first bent parts are recessed toward a direction opposite to the second direction.

4. The secondary battery according to claim 2, wherein the first bent parts each terminate at the middle point on the end face along the second direction, and positions of respective ends of the first bent parts are recessed toward a direction opposite to the second direction.

5. The secondary battery according to claim 1, wherein positions of respective ends of a plurality of the second bent parts are recessed toward a direction opposite to the third direction.

6. The secondary battery according to claim 1, further comprising an electrode wiring line coupled to each of the first bent parts and the second bent parts.

7. The secondary battery according to claim 5, further comprising an electrode wiring line coupled to each of the first bent parts and the second bent parts.

8. The secondary battery according to claim 6, further comprising an outer package member that accommodates the power generation element, wherein the outer package member includes: a first outer package part having one of a positive polarity and a negative polarity; and a second outer package part opposed to the first outer package part in the stacking direction with the power generation element interposed therebetween, the second outer package part having another of the positive polarity and the negative polarity, the current collectors each have the positive polarity or the negative polarity, the second direction is a direction, for each of the current collectors, away from the first outer package part or the second outer package part, and the first outer package part or the second package part has a polarity opposite to the current collectors.

9. The secondary battery according to claim 1, further comprising an additional electrode stacked on the plurality of electrodes in the stacking direction with the separator interposed therebetween, wherein the additional electrode includes an additional current collector led out in the first direction, and the additional current collector led out in the first direction includes an end part including an additional bent part and coupled to each of the first bent parts and the second bent parts, wherein the additional bent part is bent in the second direction and thereafter bent in the third direction.

10. The secondary battery according to claim 5, further comprising an additional electrode stacked on the plurality of electrodes in the stacking direction with the separator interposed therebetween, wherein the additional electrode includes an additional current collector led out in the first direction, and the additional current collector led out in the first direction includes an end part including an additional bent part and coupled to each of the first bent parts and the second bent parts, wherein the additional bent part is bent in the second direction and thereafter bent in the third direction.

11. The secondary battery according to claim 9, wherein the second direction is a direction away from the additional electrode.

12. The secondary battery according to claim 9, wherein the additional current collector is exposed.

13. The secondary battery according to claim 11, wherein the additional current collector is exposed.

14. The secondary battery according to claim 1, comprising:

positive electrodes including two or more of the electrodes; and negative electrodes including remaining two or more of the electrodes.

15. The secondary battery according to claim 14, wherein the first direction in each of the positive electrodes and the first direction in each of the negative electrodes are a common direction.

16. The secondary battery according to claim 14, wherein the first direction in each of the positive electrodes and the first direction in each of the negative electrodes are directions opposite to each other.

17. The secondary battery according to claim 1, further comprising an outer package member having a flat and columnar shape, wherein the outer package member is configured to accommodate the power generation element.

18. The secondary battery according to claim 1, wherein the secondary battery has a flat and columnar shape.

* * * * *